United States Patent
Zen et al.

(10) Patent No.: US 11,208,986 B2
(45) Date of Patent: Dec. 28, 2021

(54) COMPUTER SYSTEM AND METHOD FOR DETECTING IRREGULAR YAW ACTIVITY AT A WIND TURBINE

(71) Applicant: Uptake Technologies, Inc., Chicago, IL (US)

(72) Inventors: Kevin Zen, Chicago, IL (US); Benedict Augustine, Arlington Heights, IL (US)

(73) Assignee: Uptake Technologies, Inc., Chicago, IL (US)

( * ) Notice: Subject to any disclaimer, the term of this patent is extended or adjusted under 35 U.S.C. 154(b) by 244 days.

(21) Appl. No.: 16/454,413

(22) Filed: Jun. 27, 2019

(65) Prior Publication Data
US 2020/0408194 A1    Dec. 31, 2020

(51) Int. Cl.
*F03D 7/04*    (2006.01)
*F03D 7/02*    (2006.01)
(Continued)

(52) U.S. Cl.
CPC .......... *F03D 7/048* (2013.01); *F03D 7/0204* (2013.01); *F03D 7/045* (2013.01); *F03D 7/046* (2013.01);
(Continued)

(58) Field of Classification Search
CPC ........ F03D 7/048; F03D 7/0204; F03D 7/046; F03D 7/045; F03D 17/00; G06F 16/906;
(Continued)

(56) References Cited

U.S. PATENT DOCUMENTS 4,420,692 A    12/1983 Kos et al.
4,435,647 A    3/1984 Harner et al.
(Continued)

FOREIGN PATENT DOCUMENTS

CN    107781108 A    3/2018
GB    2405492 A    3/2005
(Continued)

OTHER PUBLICATIONS

Theodoropoulos et al. Fuzzy Regulator Design for a Wind Turbine Yaw Control. The Scientific World Journal, vol. 2014, Dec. 15, 2013, 9pages [online], [retrieved on Apr. 24, 2019 ] Retrieved from the Internet <URL:https://www.hindawi.com/journals/tswj/2014/516394/>.

(Continued)

*Primary Examiner* — Thomas C Lee
*Assistant Examiner* — Michael Tang
(74) *Attorney, Agent, or Firm* — Lee Sullivan Shea & Smith LLP

(57) ABSTRACT

A computing system is configured to detect irregular yawing at wind turbines. To this end, the computing system (i) for each respective turbine of an identified cluster of wind turbines: (a) obtains yaw-activity data indicative of the respective turbine's yaw activity during a window of time, and (b) based on obtained yaw-activity data, derives a yaw-activity-measure dataset having measures of the respective turbine's yaw activity during time intervals within the window of time, (ii) based on the respective yaw-activity-measure datasets for the turbines in the cluster, derives a cluster-level yaw-activity-measure dataset, (iii) evaluates the respective yaw-activity-measure dataset for one or more turbines in the cluster as compared to the cluster-level yaw-activity-measure dataset, (iv) based on the evaluation, identifies at least one turbine of the cluster that exhibited irregular yaw activity, and (v) transmits, to an output device, a notification of the irregular yaw activity at the at least one turbine.

20 Claims, 11 Drawing Sheets

(51) Int. Cl.
*G06F 16/906* (2019.01)
*G01W 1/02* (2006.01)
*F03D 17/00* (2016.01)

(52) U.S. Cl.
CPC .............. *F03D 17/00* (2016.05); *G01W 1/02* (2013.01); *G06F 16/906* (2019.01); *F05B 2270/32* (2013.01); *F05B 2270/329* (2013.01)

(58) Field of Classification Search
CPC .................... G01W 1/02; F05B 2270/32; F05B 2270/329; F05B 2260/80; Y02E 10/07
See application file for complete search history.

(56) References Cited

U.S. PATENT DOCUMENTS

| | | |
|---|---|---|
| 5,566,092 A | 10/1996 | Wang et al. |
| 5,633,800 A | 5/1997 | Bankert et al. |
| 6,256,594 B1 | 7/2001 | Yamamoto et al. |
| 6,336,065 B1 | 1/2002 | Gibson et al. |
| 6,442,542 B1 | 8/2002 | Ramani et al. |
| 6,473,659 B1 | 10/2002 | Shah et al. |
| 6,525,518 B1 | 2/2003 | Garnaes |
| 6,622,264 B1 | 9/2003 | Bliley et al. |
| 6,634,000 B1 | 10/2003 | Jammu et al. |
| 6,643,600 B2 | 11/2003 | Yanosik et al. |
| 6,650,949 B1 | 11/2003 | Fera et al. |
| 6,725,398 B1 | 4/2004 | Varma et al. |
| 6,760,631 B1 | 7/2004 | Berkowitz et al. |
| 6,775,641 B2 | 8/2004 | Wegerich et al. |
| 6,799,154 B1 | 9/2004 | Aragones et al. |
| 6,823,253 B2 | 11/2004 | Brunell |
| 6,859,739 B2 | 2/2005 | Wegerich et al. |
| 6,892,163 B1 | 5/2005 | Herzog et al. |
| 6,947,797 B2 | 9/2005 | Dean et al. |
| 6,952,662 B2 | 10/2005 | Wegerich et al. |
| 6,957,172 B2 | 10/2005 | Wegerich |
| 6,975,962 B2 | 12/2005 | Wegerich et al. |
| 7,020,595 B1 | 3/2006 | Adibhatla et al. |
| 7,082,379 B1 | 7/2006 | Bickford et al. |
| 7,100,084 B2 | 8/2006 | Unkle et al. |
| 7,107,491 B2 | 9/2006 | Graichen et al. |
| 7,127,371 B2 | 10/2006 | Duckert et al. |
| 7,233,886 B2 | 6/2007 | Wegerich et al. |
| 7,280,941 B2 | 10/2007 | Bonanni et al. |
| 7,308,385 B2 | 12/2007 | Wegerich et al. |
| 7,373,283 B2 | 5/2008 | Herzog et al. |
| 7,400,055 B2 | 7/2008 | Nagao |
| 7,403,869 B2 | 7/2008 | Wegerich et al. |
| 7,409,320 B2 | 8/2008 | Wegerich |
| 7,415,382 B1 | 8/2008 | Bickford et al. |
| 7,428,478 B2 | 9/2008 | Aragones |
| 7,447,666 B2 | 11/2008 | Wang |
| 7,457,693 B2 | 11/2008 | Olsen et al. |
| 7,457,732 B2 | 11/2008 | Aragones et al. |
| 7,509,235 B2 | 3/2009 | Bonissone et al. |
| 7,536,364 B2 | 5/2009 | Subbu et al. |
| 7,539,597 B2 | 5/2009 | Wegerich et al. |
| 7,548,830 B2 | 6/2009 | Goebel et al. |
| 7,634,384 B2 | 12/2009 | Eryurek et al. |
| 7,640,145 B2 | 12/2009 | Wegerich et al. |
| 7,660,705 B1 | 2/2010 | Meek et al. |
| 7,692,322 B2 | 4/2010 | Wakasa |
| 7,725,293 B2 | 5/2010 | Bonissone et al. |
| 7,739,096 B2 | 6/2010 | Wegerich et al. |
| 7,756,678 B2 | 7/2010 | Bonissone et al. |
| 7,822,578 B2 | 10/2010 | Kasztenny et al. |
| 7,869,908 B2 | 1/2011 | Walker |
| 7,919,940 B2 | 4/2011 | Miller et al. |
| 7,941,701 B2 | 5/2011 | Wegerich et al. |
| 7,962,240 B2 | 6/2011 | Morrison et al. |
| 8,024,069 B2 | 9/2011 | Miller et al. |
| 8,026,623 B2 | 9/2011 | Wakasa |
| 8,050,800 B2 | 11/2011 | Miller et al. |
| 8,115,331 B2 | 2/2012 | Wakasa |
| 8,145,578 B2 | 3/2012 | Pershing et al. |
| 8,186,949 B2 | 5/2012 | Nielsen |
| 8,229,769 B1 | 7/2012 | Hopkins |
| 8,234,420 B2 | 7/2012 | Lueckenbach et al. |
| 8,239,170 B2 | 8/2012 | Wegerich |
| 8,261,599 B2 | 9/2012 | Jeffrey et al. |
| 8,275,577 B2 | 9/2012 | Herzog |
| 8,285,402 B2 | 10/2012 | Lueckenbach et al. |
| 8,299,643 B2 | 10/2012 | Wakasa |
| 8,311,774 B2 | 11/2012 | Hines |
| 8,321,194 B2 | 11/2012 | Meagher et al. |
| 8,352,216 B2 | 1/2013 | Subbu et al. |
| 8,395,273 B2 | 3/2013 | Wakasa |
| 8,532,795 B2 | 9/2013 | Adavi et al. |
| 8,533,018 B2 | 9/2013 | Miwa et al. |
| 8,546,968 B2 | 10/2013 | Wakasa et al. |
| 8,560,494 B1 | 10/2013 | Downing et al. |
| 8,606,418 B1 | 12/2013 | Myers et al. |
| 8,620,618 B2 | 12/2013 | Eryurek et al. |
| 8,620,853 B2 | 12/2013 | Herzog |
| 8,626,385 B2 | 1/2014 | Humphrey |
| 8,645,276 B2 | 2/2014 | Wong et al. |
| 8,660,980 B2 | 2/2014 | Herzog |
| 8,689,108 B1 | 4/2014 | Duffield et al. |
| 8,713,467 B1 | 4/2014 | Goldenberg et al. |
| 8,786,605 B1 | 7/2014 | Curtis et al. |
| 8,799,799 B1 | 8/2014 | Cervelli et al. |
| 8,812,960 B1 | 8/2014 | Sun et al. |
| 8,832,594 B1 | 9/2014 | Thompson et al. |
| 8,850,000 B2 | 9/2014 | Collins et al. |
| 8,862,938 B2 | 10/2014 | Souvannarath |
| 8,868,537 B1 | 10/2014 | Colgrove et al. |
| 8,886,601 B1 | 11/2014 | Landau et al. |
| 8,909,656 B2 | 12/2014 | Kumar et al. |
| 8,917,274 B2 | 12/2014 | Ma et al. |
| 8,918,246 B2 | 12/2014 | Friend |
| 8,924,429 B1 | 12/2014 | Fisher et al. |
| 8,935,201 B1 | 1/2015 | Fisher et al. |
| 8,937,619 B2 | 1/2015 | Sharma et al. |
| 8,938,686 B1 | 1/2015 | Erenrich et al. |
| 9,347,431 B2 | 5/2016 | Esbensen et al. |
| 9,360,393 B2 | 6/2016 | Poon et al. |
| 9,587,629 B2 | 3/2017 | Deshpande et al. |
| 9,897,073 B2 | 2/2018 | Moerbe et al. |
| 10,180,997 B2 | 1/2019 | Kim et al. |
| 10,480,486 B2 | 11/2019 | Brodsgaard et al. |
| 10,527,520 B2 | 1/2020 | Poon et al. |
| 10,669,986 B2 | 6/2020 | Kristoffersen |
| 10,781,795 B2 | 9/2020 | Gbadamassi et al. |
| 2002/0091972 A1 | 7/2002 | Harris et al. |
| 2002/0152056 A1 | 10/2002 | Herzog et al. |
| 2003/0055666 A1 | 3/2003 | Roddy et al. |
| 2003/0126258 A1 | 7/2003 | Conkright et al. |
| 2004/0181712 A1 | 9/2004 | Taniguchi et al. |
| 2004/0230377 A1 | 11/2004 | Ghosh et al. |
| 2004/0243636 A1 | 12/2004 | Hasiewicz et al. |
| 2005/0119905 A1 | 6/2005 | Wong et al. |
| 2005/0222747 A1 | 10/2005 | Vhora et al. |
| 2006/0033338 A1 | 2/2006 | Wilson |
| 2006/0066111 A1 | 3/2006 | Suryanarayanan et al. |
| 2007/0263628 A1 | 11/2007 | Axelsson et al. |
| 2008/0059080 A1 | 3/2008 | Greiner et al. |
| 2008/0059120 A1 | 3/2008 | Xiao et al. |
| 2008/0067815 A1 | 3/2008 | Suryanarayanan et al. |
| 2009/0263245 A1 | 10/2009 | Shi et al. |
| 2009/0292397 A1 | 11/2009 | Bjerge |
| 2010/0111693 A1 | 5/2010 | Wilson |
| 2010/0274400 A1 | 10/2010 | Ormel et al. |
| 2011/0020122 A1 | 1/2011 | Parthasaralhy et al. |
| 2011/0101691 A1 | 5/2011 | Hashimoto et al. |
| 2011/0204636 A1 | 8/2011 | Scholte-Wassink |
| 2011/0270577 A1* | 11/2011 | Mihok ............... F03D 17/00 702/188 |
| 2012/0053984 A1 | 3/2012 | Manner et al. |
| 2012/0139240 A1 | 6/2012 | Claramunt et al. |
| 2012/0139740 A1 | 6/2012 | Drossel |
| 2012/0183399 A1 | 7/2012 | Perkinson |
| 2012/0185180 A1 | 7/2012 | Frederiksen |
| 2012/0209539 A1 | 8/2012 | Kim |

(56) References Cited

U.S. PATENT DOCUMENTS

| | | | |
|---|---|---|---|
| 2012/0271612 | A1 | 10/2012 | Barsoum et al. |
| 2012/0279288 | A1* | 11/2012 | Frederiksen ............ F03D 7/048 73/112.01 |
| 2012/0310597 | A1 | 12/2012 | Uchiyama et al. |
| 2013/0010610 | A1 | 1/2013 | Karthikeyan et al. |
| 2013/0024416 | A1 | 1/2013 | Herzog |
| 2013/0283773 | A1 | 10/2013 | Hague |
| 2013/0287567 | A1 | 10/2013 | Olesen et al. |
| 2013/0294911 | A1 | 11/2013 | Egedal |
| 2013/0325502 | A1 | 12/2013 | Robicsek et al. |
| 2014/0012886 | A1 | 1/2014 | Downing et al. |
| 2014/0032132 | A1 | 1/2014 | Stratton et al. |
| 2014/0060030 | A1 | 3/2014 | Ma et al. |
| 2014/0088887 | A1 | 3/2014 | Poon et al. |
| 2014/0089035 | A1 | 3/2014 | Jericho et al. |
| 2014/0105481 | A1 | 4/2014 | Hasselbusch et al. |
| 2014/0116124 | A1 | 5/2014 | Ma et al. |
| 2014/0121868 | A1 | 5/2014 | Zhang et al. |
| 2014/0169398 | A1 | 6/2014 | Arndt et al. |
| 2014/0170617 | A1 | 6/2014 | Johnson et al. |
| 2014/0184643 | A1 | 7/2014 | Friend |
| 2014/0195199 | A1* | 7/2014 | Uluyol .................... F03D 7/048 702/189 |
| 2014/0222355 | A1 | 8/2014 | Cheim et al. |
| 2014/0324495 | A1 | 10/2014 | Zhou et al. |
| 2014/0330600 | A1 | 11/2014 | Candas et al. |
| 2014/0330749 | A1 | 11/2014 | Candas et al. |
| 2014/0351642 | A1 | 11/2014 | Bates et al. |
| 2014/0357295 | A1 | 12/2014 | Skomra et al. |
| 2014/0358601 | A1 | 12/2014 | Smiley et al. |
| 2014/0365187 | A1 | 12/2014 | Guzman et al. |
| 2015/0046870 | A1 | 2/2015 | Goldenberg et al. |
| 2015/0085297 | A1 | 3/2015 | Hughes et al. |
| 2015/0240783 | A1 | 8/2015 | Kii et al. |
| 2015/0262060 | A1 | 9/2015 | Husain et al. |
| 2015/0345476 | A1 | 12/2015 | Gregg et al. |
| 2015/0381451 | A1* | 12/2015 | Kolotov .................... H04J 3/14 709/224 |
| 2016/0034856 | A1 | 2/2016 | Son |
| 2016/0115941 | A1 | 4/2016 | Marwaha et al. |
| 2016/0153427 | A1 | 6/2016 | Bunge |
| 2016/0169205 | A1 | 6/2016 | Wang et al. |
| 2016/0222946 | A1 | 8/2016 | Krings |
| 2017/0335827 | A1* | 11/2017 | Wilson .................... F03D 7/048 |
| 2018/0010576 | A1 | 1/2018 | Brake et al. |
| 2018/0058425 | A1 | 3/2018 | Deshpande et al. |
| 2018/0245568 | A1 | 8/2018 | Pedersen et al. |
| 2018/0347542 | A1 | 12/2018 | Tomas et al. |
| 2019/0010922 | A1* | 1/2019 | Baba ...................... F03D 80/50 |
| 2020/0057011 | A1* | 2/2020 | Tuma ................. G01N 23/2252 |
| 2020/0125978 | A1 | 4/2020 | Abbaszadeh et al. |
| 2020/0271096 | A1* | 8/2020 | Ou ........................ F03D 7/0204 |
| 2020/0340450 | A1 | 10/2020 | Grunnet et al. |
| 2020/0363282 | A1 | 11/2020 | Sereema |
| 2021/0108617 | A1* | 4/2021 | Miranda .................... F03D 1/02 |

FOREIGN PATENT DOCUMENTS

| | | |
|---|---|---|
| KR | 20160073945 A | 6/2016 |
| WO | 2011117570 | 9/2011 |
| WO | 2013034420 | 3/2013 |
| WO | 2014145977 | 9/2014 |
| WO | 2014205497 | 12/2014 |
| WO | 201 7178027 A1 | 10/2017 |
| WO | 2017194067 A1 | 11/2017 |

OTHER PUBLICATIONS

Pei et al. Data-Driven Method for Wind Turbine Yaw Angle Sensor Zero-Point Shifting Fault Detection. Energies 2018, vol. 11, No. 553, Feb. 10, 2018,14 pages [online], [retrieved on Apr. 24, 2019] Retrieved from the Internet <URL:https://www.mdpi.com/journal/energies>.

Castellani et al. The Yawing Behavior of Horizontal-Axis Wind Turbines: A Numerical and Experimental Analysis. Machines, 2019, vol. 7, No. 15, Dec. 21, 2018, 16 pages [online], [retrieved on Apr. 24, 2019 ] Retrieved from the Intenet <URL://https://www.mdpi.com/jounal/machines>.

Windfit Yaw Performance Analyzer. Datasheet, 1 page [online] Sereema [retrieved on Apr. 24, 2019], Retrieved from the Internet <URL:https://www.sereema.com/solutions/windfit-yaw-performance-analyzer>.

Pedersen et al. Yaw Misalignment and Power Curve Analysis. ROMO Wind EWEA Analysis of Operating Wind Farms 2016—Bibao—Apr. 14-15, 2016, 1 page [online], [retrieved on Apr. 24, 2019] Retrieved from the Internet <URL:http://www.ewea.org/events/workshops/wp-content/uploads/Tech16a-PO-017.pdf>.

Biswas, Trisha. Redundancy-based Approaches in Wireless Multihop Network Design. PhD Dissertation Submitted to Graduate Faculty of North Carolina State University, Raleigh, North Carolina, Mar. 25, 2014, pp. 1-141 [online], [retrieved on May 26, 2015]. Retrieved from the Internet <URL:https://repository.lib.ncsu.edu/bitstream/handle/1840.16/9313/etd.pdf?sequence=2&isAllowed=y>.

Isermann, Rolf. Model-based Fault Detection and Diagnosis—Status and Applications. Institute of Automatic Control, Darmstadt University of Technology, Darmstadt, Germany, Jun. 2004, pp. 1-12.[online], [retrieved on Oct. 8, 2015], Retrieved from the Internet <URL: http://citeseerx.ist.psu.edu/viewdoc/download?doi=10.1.1.113. 9295&rep=rep1&type=pdf>.

Narasimhan et al. Combining Model-Based and Feature-Driven Diagnosis Approaches—A Case Study on Electromechanical Actuators. 21st International Workshop on Principles of Diagnosis 2010, pp. 1-8. [online], [retrieved on Oct. 8, 2015] Retrieved from the Internet <URL:https://ti.arc.nasa.gov/publications/2266/download/>.

Prentzas et al. Categorizing Approaches Combining Rule-Based and Case-Based Reasoning. Expert Systems 24, Apr. 17, 2007, pp. 1-34 [online], [retrieved on Oct. 8, 2015], Retrieved from the Internet <URL:http://citeseerx.ist.psu.edu/viewdoc/download?doi=1.1.143.2780&rep=rep1&type=pdf>.

Infor M3 Enterprise Management System. Datasheet [online]. Infor, 2014 [retrieved May 19, 2015]. Retrieved from the Internet: <URL:www.infor.com.html>.

Infor Equipment. Datasheet [online]. Infor, 2012 [retrieved May 19, 2015]. Retrieved from the Internet:<URL:www.infor.com.html>.

Infor Introduces Next-Generation Solution for Equipment Dealers and Service Providers. Infor, Feb. 2014 pp. 1-5. [online], [retrieved May 19, 2015]. Retrieved from the Internet:<URL:www.infor.com/company/news/pressroom/pressreleases/M3equipment.html>.

Infor Equipment for Rental. Datasheet [online] Infor, 2013 [retrieved May 19, 2015]. Retrieved from the Internet:<URL: www.infor.com.html>.

Waltermire et al. Applying the Continuous Monitoring Technical Reference Model to the Asset, Configuration, and Vulnerability Management Domains (DRAFT). National Institute of Standards and Technology, U.S. Department of Commerce, Jan. 2012, pp. 1-23 [online], [retrieved Oct. 6, 2015]. Retrieved from the Internet: URL<https://csrc.nist.gov/CSRC/media/Publications/nistir/7800/draft/documents/Draft-NISTIR-7800.pdf.

Z. Daneshi-Far et al., Review of Failures and Condition Monitoring in Wind Turbine Generators, XIX International Conference on Electrical Machines—ICEM 2010, Rome, 1-6. (Year:2010).

Jan Helsen et al., Long Term Monitoring of Wind Farms Using Big Data Approach, 2016 IEEE Second International Conference on Big Data Computing Service and Application, 265-268, (Year: 2016).

Can Huang et al., Maximum Power Point Tracking Strategy for Large-Scale Wind Generation Systems Considering Wind Turbine Dynamics, IEEE Transactions on Industrial Electronics, vol. 62, No. 4, Apr. 2015, 2530-2539. (Year: 2015).

Muhammad Khalid and Andrey V. Savkin, A Method for Short-Term Wind Power Prediction With Multiple Observation Points, IEEE Transactions on Power Systems, vol. 27, No. 2, May 2012, 579-586. (Year: 2012).

\* cited by examiner

COMPUTER SYSTEM AND METHOD FOR DETECTING IRREGULAR YAW ACTIVITY AT A WIND TURBINE

BACKGROUND

In recent years, there has been a focus on utilizing renewable energy sources to help reduce reliance on fossil fuels. One example renewable energy source is a wind turbine that converts wind's kinetic energy into electricity. Broadly speaking, a wind turbine is an asset that utilizes multiple subsystems to help accomplish this conversion. Typically, a wind site (also known as a "wind farm" or "wind park"), which includes numerous wind turbines, is arranged at a geographical location that experiences windy conditions and provides electricity to an existing power grid.

Because of the increasing reliance on wind turbines to generate renewable energy, it is also becoming increasingly desirable to monitor and analyze wind turbines in operation. To facilitate this, some have developed mechanisms to monitor wind turbine attributes and detect abnormalities at a wind turbine.

Overview

A typical wind turbine includes a nacelle that sits atop the wind turbine's tower and houses the main components of the turbine's drivetrain including a drive shaft, gearbox, generator, brake assembly, etc. The drive shaft is coupled to a rotor that includes a hub to which two or more blades are attached and a pitch system that controls the blades' pitch angles. When wind passes over the turbine's blades, the blades and rotor rotate driving the drive shaft, which results in the wind turbine generating electricity.

Generally, a wind turbine's electricity production is maximized when the wind turbine's nacelle is aligned with the direction of the wind, which often changes. In this respect, ideally, a wind turbine is orientated such that the plane of its blades is perpendicular to the direction of the wind. To help realize this alignment and maximize power performance, a wind turbine is equipped with a wind vane (or other wind-direction sensor) and a yaw system that physically rotates the wind turbine to follow the direction of the wind as measured by the wind vane. Thus, a wind turbine's yaw rotations (i.e., "yaw activity") may reflect whether the wind turbine is efficiently tracking the wind's direction and thereby, efficiently generating electricity.

However, at times, a wind turbine may engage in irregular yaw activity relative to what the wind turbine's yaw activity should have been in order to properly track the wind's direction, such as "over-yawing" (i.e., rotating more than necessary to track the wind direction) or "under-yawing" (i.e., rotating less than necessary to track the wind direction). Irregular yaw activity may be the result of a variety of causes. For example, irregular yaw activity may be due to a malfunctioning wind vane (or other wind-direction sensor), a malfunctioning yaw-system controller card, and/or some other yaw-system electronics issue, among other possibilities.

When a wind turbine engages in irregular yawing, the turbine's nacelle does not properly track the direction of the wind, which can degrade the power performance of the wind turbine (sometimes in a significant manner). Additionally, excessive yawing at a wind turbine could lead to various other downstream issues, including accelerated deterioration of the turbine's yaw system that leads to additional maintenance and/or earlier replacement of the yaw system as a whole or some of its components. In some cases, if the cause of a wind turbine's irregular yawing goes undetected for long enough, it could even eventually cause the wind turbine to shut down completely, which means increased downtime and cost. Irregular yawing may lead to other problems at a wind turbine as well.

In view of the foregoing, there is a need for technology that is capable of detecting irregular yaw activity at a wind turbine, so that the cause of the irregular yaw activity can be identified and remedied to help avoid the negative consequences described above. However, existing technology for detecting irregular yaw activity at a wind turbine has significant drawbacks. For instance, some current approaches for detecting irregular yaw activity at a wind turbine require access to both (i) MET tower readings of wind direction and (ii) accurate readings of a wind turbine's nacelle orientation relative to true north, and in many cases, one or both of these readings will not be available. Other current approaches require specialized equipment (e.g., LIDAR equipment) that a human manually positions on a wind turbine to identify and correct a misaligned wind vane, but such approaches are time consuming, expensive, and merely offer a temporary fix to irregular yaw activity at a wind turbine. Yet other current approaches require retrofitting a wind turbine with specialized sensors and/or equipment after the wind turbine has been assembled and installed at a wind site and then evaluating measurements of these specialized sensors and/or equipment as a means of detecting irregular yaw activity. However, as just discussed, these current approaches are time consuming, costly, often times infeasible, prone to error, and/or reliant on post-assembly installation of specialized sensors and/or other equipment, among other disadvantages.

To help address these and other problems, the present disclosure is directed to an improved technological process for detecting irregular yaw activity at a wind turbine by determining a respective measure of yaw activity for each wind turbine in a "cluster" of wind turbines, such as the amount of "yaw distance" travelled by a turbine's nacelle while yawing or the amount of "yaw time" that a turbine's nacelle spent yawing, and then using the respective measures of yaw activity for the cluster of wind turbines to evaluate how the yaw activity for any given wind turbine in the cluster compares to the yaw activity of the cluster as a whole.

In practice, a data analytics platform that is configured to monitor and/or analyze the operation of wind turbines may begin this process by identifying a cluster of two or more wind turbines at a given wind farm that are considered to be "peers." Generally, a wind farm is distributed across a geographical area that is large enough that meteorological conditions may vary across the area. For example, some portion of a wind farm may experience wind patterns and wind speeds that differ from other portions of the wind farm. Moreover, meteorological conditions may vary from one point in time to another such that the meteorological conditions experienced at a particular portion of the wind farm may change over time. Accordingly, while some wind turbines of a wind farm may experience one or more meteorological conditions in a different manner than other wind turbines of the wind farm, a cluster of wind turbines may experience one or more common meteorological conditions. In example implementations, wind turbines are considered to be peers if they experience one or more of the same or substantially similar meteorological conditions (e.g., wind direction, wind speed, air density, etc.) during a given period of time.

In any case, the data analytics platform may be configured to identify a cluster of two or more wind turbines that are considered to be peers in a variety of manners. For instance, the data analytics platform may identify a cluster of wind turbines that experienced one or more similar meteorological conditions during a given period of time (e.g., the past week) based on (i) data indicative of the geographical location of the wind turbines within a wind farm, (ii) meteorological data captured by the wind turbines within the wind farm during the given period of time, and/or (iii) weather data indicative of wind characteristics at the wind farm during the given period of time from a source outside of the wind farm, among other possibilities.

After the cluster is identified, the data analytics platform may then obtain, for each respective wind turbine in the cluster, data that is indicative of the respective wind turbine's yaw activity during a "lookback" window (e.g., the past 1-3 days). This yaw-activity data for each respective wind turbine may take a variety of forms, such as (i) time-series nacelle-position data indicating the nacelle position of the respective wind turbine at two or more points in time within the lookback window (e.g., on a scale of 0 to 360 degrees relative to the respective turbine's nacelle's centerline), (ii) nacelle "tick" count data indicating the number of times the respective wind turbine's yaw system's gear "ticked" by one gear tooth during the lookback window, (iii) time-series readings of a binary flag indicating the respective wind turbine's nacelle's rotation state (e.g., rotating versus not rotating, rotating clockwise versus rotating counter-clockwise, etc.), and/or (iv) timer-based data indicating the amount of time the respective wind turbine spent yawing during the lookback window, among other forms of data. Notably, in practice, not all forms of yaw-activity data may be available for each wind turbine, which may be the case within a given wind farm and even within a given cluster.

In example embodiments, the data analytics platform may be configured to define the lookback window in a variety of manners. In some implementations, the lookback window may be predefined to a certain timeframe in the past (e.g., a certain number of days), which may be updateable based on a software update or the like for the data analytics platform. In other implementations, the data analytics platform may dynamically define the lookback window itself, such as by utilizing machine learning techniques.

Next, the data analytics platform may use the obtained yaw-activity data to derive, for each respective wind turbine in the cluster, a time-series "yaw activity measure" dataset that comprises respective measures of the respective wind turbine's yaw activity during discrete time intervals within the lookback window (e.g., a respective measure of yaw activity during each 1-hour period within the lookback window). In practice, the data analytics platform may derive the time-series "yaw activity measure" dataset for a given wind turbine based on only one form of yaw-activity data or multiple, different forms of yaw-activity data.

Further, in practice, the data analytics platform may perform the function of deriving a wind turbine's "yaw activity measure" dataset based on obtained yaw-activity data for the wind turbine in a variety of manners, which may depend on the form of the obtained yaw-activity data, the sampling rate of yaw-activity data, and/or the target length of the discrete time intervals, among other factors.

As an example to illustrate, if the obtained yaw-activity data for a given wind turbine comprises time-series nacelle-position data, the data analytics platform's approach for deriving the given wind turbine's "yaw activity measure" dataset may vary depending on how the sampling rate of the nacelle-position data compares to the target length of the discrete time intervals—as that comparison may provide some indication of the risk that the wind turbine engaged in multiple, different rotations during a discrete time interval having the target length (which could in turn impact how to accurately calculate a "yaw activity measure" based on nacelle-position data).

For instance, if there is a small number of nacelle-position datapoints sampled during each discrete time period of the target length—which may indicate that the risk of the wind turbine having engaged in multiple different rotations during a discrete time interval is relatively low—the data analytics platform's approach for deriving the "yaw activity measure" dataset for the given wind turbine may involve (i) breaking the nacelle-position dataset up on a discrete interval-by-interval basis and then (ii) calculating a difference between either the maximum and minimum nacelle position within each respective discrete time interval or the last and first nacelle position within each respective discrete time interval, where this calculated difference value comprises the "yaw activity measure" for the discrete time interval.

On the other hand, if there is a large number of nacelle-position datapoints sampled during each discrete time period of the target length—which may indicate that the risk of the wind turbine having engaged in multiple different rotations during a discrete time interval is relatively high—the data analytics platform's approach for deriving the "yaw activity measure" dataset for the given wind turbine may involve (i) breaking the nacelle-position dataset into sub-intervals having a length that is smaller than the target length of the discrete time intervals, (ii) calculating a difference between either the maximum and minimum nacelle position within each respective sub-interval or the last and first nacelle position within each respective sub-interval, and then (iii) on a discrete time interval-by-interval basis, aggregating (e.g., "rolling up") the calculated difference values for the sub-intervals falling within the discrete time interval to produce a single difference value for the discrete time interval, which comprises the "yaw activity measure" for the discrete time interval.

While performing these calculations on time-series nacelle-position data, the data analytics platform may also be presented with an additional challenge—it is possible that the nacelle-position data may be measured on a scale of 0 to 360 degrees (rather than −720 to 720 degrees), which may obscure which direction the wind turbine rotated from one time to another and thereby inhibit the data analytics platform's ability to accurately determine the difference values between nacelle-position measurements. For example, if time-series nacelle-position data indicates a given wind turbine's nacelle position of 0 degrees at time $t_1$ and 355 degrees at time $t_2$, it is ambiguous as to whether the given wind turbine rotated clockwise 355 degrees (i.e., a difference value of 355) or rotated counterclockwise 5 degrees between $t_1$ and $t_2$ (i.e., a difference value of 5). To address this ambiguity, the data analytics platform may be configured such that, while calculating a difference between two nacelle positions during a time interval of interest (e.g., a discrete time interval or sub-interval thereof), the data analytics platform may apply an assumption that a wind turbine cannot rotate by more than 180 degrees during the time interval and then "normalize" any calculated difference that is greater than 180 degrees to reflect this assumption (e.g., by adding or subtracting 360 degrees).

It should be understood that the data analytics platform's approach for deriving the "yaw activity measure" dataset for the given wind turbine may take other forms as well— including the possibility that the data analytics platform may adjust the target length of the discrete time intervals in view of the form and/or sampling rate of the obtained yaw-activity data.

In some implementations, the function of deriving a time-series "yaw activity measure" dataset for each respective wind turbine in the cluster may also involve filtering each respective dataset. This filtering function may take various forms.

For instance, as one possibility, the data analytics platform may filter each respective wind turbine's "yaw activity measure" dataset to remove data corresponding to yaw activity for any periods of time during which that particular wind turbine may have been shutdown or otherwise intentionally configured to not track the wind's direction (e.g., the wind turbine was in a state of "downtime"). To that end, the data analytics platform may filter a given wind turbine's "yaw activity measure" dataset based on a variety of other data related to the operation of the given wind turbine, such as (i) energy-production data indicating that the given wind turbine was producing less than a threshold level of power, which the data analytics platform infers is indicative of a period of turbine-specific downtime and/or (ii) blade-pitch data indicating that the given wind turbine's blade angle was outside a threshold angle range that typically corresponds to a turbine in "normal" operation (e.g., an angle outside of the range of −2 to 5 degrees for a turbine with a pitch-angle range of −2 to 90 degrees), which the data analytics platform infers is indicative of an untwisting event taking place at the given wind turbine or other human-intervention event taking place at the given wind turbine. Other examples of data that may be used for turbine-specific filtering are also possible.

As another possibility, the data analytics platform may filter each respective wind turbine's "yaw activity measure" dataset to remove data corresponding to yaw activity for any periods of time during which the cluster as a whole may have been shutdown or otherwise intentionally configured to not track the wind's direction. To that end, the data analytics platform may filter each respective wind turbine's "yaw activity measure" dataset based on a variety of other data related to the operation of the cluster, such as (i) weather data for the cluster's geographic location satisfying criteria that is indicative of an icing event at the cluster, which the data analytics platform infers is indicative of a period of cluster-wide downtime, and/or (ii) energy-production data indicating that a threshold extent of the wind turbines in the cluster (e.g., 50%) were producing less than a threshold level of power, which the data analytics platform infers is indicative of a period of cluster-wide downtime. Other examples of data that may be used for cluster-wide filtering are also possible.

In some implementations, one or more filter thresholds may be defined and/or adjusted utilizing machine learning techniques, which may be performed on a turbine-by-turbine or cluster-wide basis. For example, the data analytics platform may define a threshold blade-pitch angle that defines when a wind turbine is deemed to be in "normal" operation using a machine learning technique.

The data analytics platform may filter the "yaw activity measure" datasets for the wind turbines in the cluster in other manners as well.

After deriving a time-series "yaw activity measure" dataset for each respective wind turbine in the cluster (and potentially filtering the datasets), the data analytics platform may then derive a cluster-level "yaw activity measure" for each discrete time interval within the lookback window. In practice, the data analytics platform may perform this operation in a variety of manners. As one possibility, the data analytics platform may evaluate the turbine-level "yaw activity measure" datasets on an interval-by-interval basis, and for each such time interval, the data analytics platform may apply an aggregation function (e.g., averaging, identifying the median value, etc.) to the turbine-level "yaw activity measures" for the time interval across the cluster of wind turbines in order to derive a cluster-level "yaw activity measure" for the time interval. Thus, by performing this operation for each discrete time interval within the lookback window, the data analytics system may produce a cluster-level "yaw activity measure" dataset. Other manners of performing this function are also possible.

Next, the data analytics platform may determine, for each respective wind turbine in the cluster, a respective time-series "yaw activity differential" dataset based on the derived cluster time-series "yaw activity measure" dataset. For example, the data analytics platform may calculate, for each respective wind turbine in the cluster, a respective time-series "yaw activity differential" dataset that comprises a respective difference value between the respective wind turbine's "yaw activity measure" and the cluster-level "yaw activity measure" during each discrete time interval within the lookback window.

Thereafter, the data analytics platform may evaluate the respective "yaw activity differential" dataset for each respective wind turbine in the cluster to identify any "outlier" turbines having yaw activity that meaningfully diverges from the yaw activity of the other turbines in the cluster during the lookback window. In practice, the data analytics platform may perform this evaluation in a variety of manners.

In one implementation, each turbine's "yaw activity differential" dataset may be evaluated using a data science model that is configured to (i) receive a "yaw activity differential" dataset for a given wind turbine as its input and (ii) output an indication of whether that given wind turbine's "yaw activity differential" dataset is indicative of irregular yaw activity. Such a data science model may take various forms.

As one possibility, the data science model may comprise a predictive model that is derived by applying a machine-learning technique (e.g., logistic regression, support vector machine, random forest, neural network, etc.) to training data that includes historical "yaw activity differential" datasets for a plurality of wind turbines that have been derived in the manner described above, perhaps along with labels indicating times when the plurality of wind turbines were known to be exhibiting irregular yaw activity.

As another possibility, the data science model may comprise a rules-based model that is derived by identifying values or ranges of values (and/or other features indicative of irregular yaw activity) corresponding to wind turbines exhibiting "regular" yaw activity and then in turn identifying one or more deviations from these values or ranges of values (and/or other features) that are associated with wind turbines exhibiting irregular yaw activity, which may then be embodied into a set of rules that comprises the rules-based model for detecting irregular yaw activity. For example, a rules-based model may be configured to detect irregular yaw activity at a given wind turbine if the turbine's "yaw activity differential" dataset exceeds a threshold differential value during a threshold number of time intervals within the lookback window. As another example, a rules-based model may be configured to detect irregular yaw activity at a given wind turbine when the turbine's "yaw activity differential" dataset exceeds a threshold differential value during a threshold number of consecutive time windows of a given length (e.g., at least one exceedance every few hours).

The data analytics platform may evaluate the respective "yaw activity differential" dataset for each respective wind turbine in the cluster to identify outlier turbines using other types of data science models and/or other techniques as well.

If the evaluation of the "yaw activity differential" dataset for each turbine in the cluster leads to an identification of one or more "outlier" turbines, the data analytics platform may generate an output (e.g., an alert or other notification) and provide the output to an individual responsible for overseeing the operation of the wind-turbine cluster, such as by presenting a representation of an alert or notification at a work station, mobile device, or the like. In some cases, the data analytics platform may be configured to perform various other functions as a result of evaluating the "yaw activity differential" datasets for irregular yaw activity as well.

Accordingly, in one aspect, disclosed herein is a computer-implemented method for detecting irregular yaw activity at a wind turbine that involves (i) identifying a cluster of two or more wind turbines, (ii) for each respective wind turbine of the cluster: (a) obtaining yaw-activity data that is indicative of the respective wind turbine's yaw activity during a particular window of time, and (b) based on obtained yaw-activity data, deriving a respective yaw-activity-measure dataset that comprises respective measures of the respective wind turbine's yaw activity during a plurality of time intervals within the particular window of time, (iii) based on the respective yaw-activity-measure datasets for the two or more wind turbines in the cluster, deriving a cluster-level yaw-activity-measure dataset comprising a cluster-level yaw-activity-measure for each of the plurality of time intervals within the particular window of time, (iv) performing an evaluation of the respective yaw-activity-measure dataset for each of one or more wind turbines in the cluster as compared to the cluster-level yaw-activity-measure dataset, (v) based on the evaluation, identifying at least one wind turbine of the cluster that exhibited irregular yaw activity, and (vi) transmitting, to an output device via a data network, a notification of the irregular yaw activity at the at least one wind turbine.

In another aspect, disclosed herein is a computing system comprising a network interface, at least one processor, a non-transitory computer-readable medium, and program instructions stored on the non-transitory computer-readable medium that are executable by the at least one processor to cause the computing system to carry out the functions disclosed herein associated with detecting irregular yaw activity at a wind turbine.

In yet another aspect, disclosed herein is a non-transitory computer-readable medium having instructions stored thereon that are executable to cause a computing system to carry out the functions disclosed herein associated with detecting irregular yaw activity at a wind turbine.

One of ordinary skill in the art will appreciate these as well as numerous other aspects in reading the following disclosure.

DETAILED DESCRIPTION

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

I. Example Network Configuration

Figure 1:
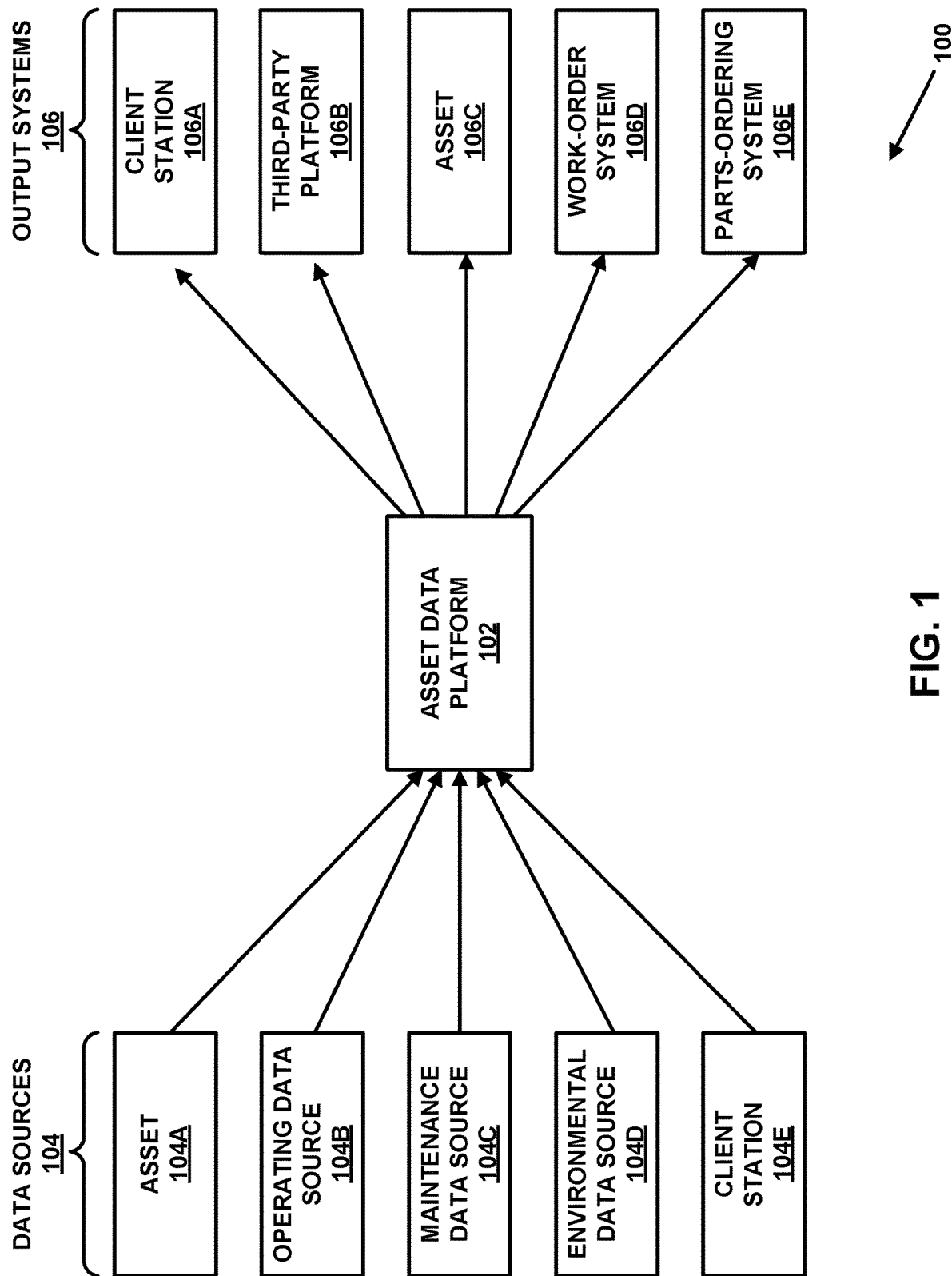
FIG. 1 depicts an example network configuration in which example embodiments may be implemented.

Turning now to the figures, FIG. 1 depicts an example network configuration 100 in which example embodiments may be implemented. As shown, network configuration 100 includes at its core a central computing system 102, which may be communicatively coupled to one or more data sources 104 and one or more output systems 106 via respective communication paths. In such an arrangement, central computing system 102 may generally serve as an "asset data platform" (also referred to herein as a "data analytics platform") that is configured to perform functions to facilitate the monitoring, analysis, and/or management of various types of "assets," which may take various forms.

For instance, some representative types of assets that may be monitored by asset data platform 102 may include electric power generation equipment (e.g., wind turbines, gas turbines, coal boilers), transport vehicles (e.g., locomotives, aircrafts, passenger vehicles, trucks, ships, etc.), equipment for construction, mining, farming, or the like (e.g., excavators, bulldozers, dump trucks, earth movers, etc.), manufacturing equipment (e.g., robotics devices, conveyor systems, and/or other assembly-line machines), petroleum production equipment (e.g., gas compressors, distillation columns, pipelines), and data network nodes (e.g., personal computers, routers, bridges, gateways, switches, etc.), among other examples. Additionally, an asset may have various other characteristics that more specifically define the type of asset, examples of which may include the asset's brand, make, model, vintage, and/or software version, among other possibilities. In this respect, depending on the implementation, the assets monitored by asset data platform 102 may either be of the same type or various different types. Additionally yet, the assets monitored by asset data platform 102 may be arranged into one or more "sites" (or "parks"/"farms") of assets, which refers to any group or two or more assets that are related to one another in some manner (regardless of whether such assets are of the same type).

Broadly speaking, asset data platform 102 may comprise one or more computing systems that have been provisioned with software for carrying out one or more of the platform functions disclosed herein, including but not limited to receiving data related to the operation and/or management of assets (broadly referred to herein as "asset-related data") from data sources 104, performing data ingestion and/or data analytics operations on the asset-related data received from asset data sources 104, and then outputting data and/or instructions related to the operation and/or management of assets to output systems 106. The one or more computing systems of asset data platform 102 may take various forms and be arranged in various manners.

For instance, as one possibility, asset data platform 102 may comprise computing infrastructure of a public, private, and/or hybrid cloud (e.g., computing and/or storage clusters) that has been provisioned with software for carrying out one or more of the platform functions disclosed herein. In this respect, the entity that owns and operates asset data platform 102 may either supply its own cloud infrastructure or may obtain the cloud infrastructure from a third-party provider of "on demand" computing resources, such as Amazon Web Services (AWS), Microsoft Azure, Google Cloud, Alibaba Cloud, or the like. As another possibility, asset data platform 102 may comprise one or more dedicated servers that have been provisioned with software for carrying out one or more of the platform functions disclosed herein. Other implementations of asset data platform 102 are possible as well.

Further, in practice, the software for carrying out the disclosed platform functions may take various forms. As one possibility, the platform software may comprise executable program instructions that cause asset data platform 102 to perform data ingestion operations on asset-related data received from data sources 104, including but not limited to extraction, transformation, and loading operations, among other examples. As another possibility, the platform software may comprise executable program instructions that cause asset data platform 102 to perform data analytics operations based on the asset-related data received from data sources 104, including but not limited to failure prediction, anomaly detection, noise filtering, predictive recommendations, and label correction, among other examples. As yet another possibility, the platform software may comprise executable program instructions that cause asset data platform 102 to output data and/or instructions related to the operation and/or management of assets for receipt by one or more output systems 106.

As one specific example, the platform software may comprise executable program instructions for outputting data related to the operation and/or management of assets that is to be presented to a user (e.g., asset-related data received from data sources 104 and/or the results of the data analytics operations performed by asset data platform 102), and these program instructions may take the form of discrete "applications" that are each tailored for particular end users, particular groups of assets, and/or particular purposes. Some representative examples of such applications may include an asset performance management application, an asset site management application, a service optimization application, and an asset dealer operations application, among other possibilities.

The software for carrying out the disclosed platform functions may take various other forms as well.

As described above, asset data platform 102 may be configured to receive asset-related data from one or more data sources 104. These data sources—and the asset-related data output by such data sources—may take various forms. To illustrate, FIG. 1 shows some representative examples of data sources 104 that may provide asset-related data to asset data platform 102, which are discussed in further detail below. However, it should be understood that these example data sources are merely provided for purposes of illustration, and that asset data platform 102 may be configured to receive asset-related data from other types of data sources as well.

For instance, one type of data source 104 may take the form of an asset 104A, which may be equipped with components that are configured to capture data that is indicative of the operation of the asset—referred to herein as "operating data"—and then transmit the asset's operating data to asset data platform 102 over the respective communication path between asset 104A and asset data platform 102. In this respect, asset 104A may take any of the various forms described above, including but not limited to electric power generation equipment, transport vehicles, heavy equipment, manufacturing equipment, and/or petroleum production equipment, among other types of assets. Further, it should be understood that the components of asset 104A for capturing and transmitting the asset's operating data either may be included as part of asset 104A as assembled and installed at a site or may be affixed to asset 104A at some later date, among other possibilities.

The operating data that is captured and sent by asset 104A may take various forms. As one possibility, an asset's operating data may include sensor data that comprises time-series measurements for certain operating parameters of the asset, examples of which may include vibration, speed, velocity, acceleration, location, weight, temperature, pressure, friction, power usage, throttle position, fluid usage, fluid level, voltage, current, magnetic field, electric field, presence or absence of objects, current position of a component, and power generation, among many others. As another possibility, an asset's operating data may include abnormal-conditions data that indicates occurrences of discrete abnormal conditions at the asset, examples of which include fault codes that indicate the occurrence of certain faults at the asset (e.g., when an operating parameter exceeds a threshold), asset shutdown indicators, and/or other types of abnormal-condition indicators. As yet another possibility, an asset's operating data may include data that has been derived from the asset's sensor data and/or abnormal-conditions data, examples of which may include "roll-up" data (e.g., an average, mean, median, etc. of the raw measurements for an operating parameter over a given time window) and "features" data (e.g., data values that are derived based on the raw measurements of two or more of the asset's operating parameters). An asset's operating data may take various other forms as well.

In practice, an asset's operating data may also include or be associated with data that identifies the origin of the operating data. This origin data may take various forms. For example, such origin data may include identifying information for the originating asset (e.g., an asset ID and/or data indicating the asset's type, brand, make, model, age, software version, etc.) and/or identifying information for the component of asset 104A that captured the operating data (e.g., a sensor ID), among other possibilities. As another example, such origin data may include data indicating the time at which the operating data was captured (e.g., a timestamp) and/or the asset's location when the operating data was captured (e.g., GPS coordinates), to the extent that such location is not otherwise included in the operating data. Asset data platform 102 may receive other types of data from asset 104A as well.

Further, asset data platform 102 may be configured to receive operating data from asset 104A in various manners. As one possibility, asset 104A may be configured to send its operating data to asset data platform 102 in a batch fashion, in which case asset data platform 102 may receive periodic transmissions of operating data from asset 104A (e.g., on an hourly, daily, or weekly basis). As another possibility, asset data platform 102 may receive operating data from asset 104A in a streaming fashion as such operating data is captured by asset 104A. As yet another possibility, asset data platform 102 may receive operating data from asset 104A in response to sending a request for such data to asset 104A, in which case asset data platform 102 may be configured to periodically send requests for operating data to asset 104A. Asset data platform 102 may be configured to receive operating data from asset 104A in other manners as well.

Another type of data source 104 may take the form of operating data source 104B, which may comprise a computing system that is configured to receive operating data from one or more upstream sources of operating data (e.g., assets) and then provide this operating data to asset data platform 102 over the respective communication path between operating data source 104B and asset data platform 102. Such an operating data source may take various forms. As one possibility, operating data source 104B may comprise an existing data platform of a third-party organization that receives and/or maintains operating data for one or more assets, such as a data platform operated by an asset owner, an asset dealer, an asset manufacturer, an asset repair shop, or the like. As another possibility, operating data source 104B may comprise an intermediary system that compiles operating data from a plurality of upstream sources of operating data and then provides that compiled operating data to asset data platform 102. For example, such an intermediary system may take the form of a computing system located in proximity to a site of assets (e.g., at a wind farm) that is configured to compile operating data for the fleet of assets or a computing system that is configured to compile operating data maintained by several third-party data platforms, among other possibilities. Operating data source 104B may take other forms as well.

The operating data that is maintained and sent by operating data source 104B may take various forms, including but not limited to any of the forms described above. In addition to the operating data received from the one or more upstream sources, the operating data provided by operating data source 104B may also include additional operating data that is generated by operating data source 104B itself, such as operating data that operating data sources 104B derives based on the operating data received from the one or more upstream sources (e.g., abnormal-conditions data, roll-up data, features data, etc.).

Further, as with asset 104A, asset data platform 102 may be configured to receive operating data from operating data source 104B in various manners. As one possibility, operating data source 104B may be configured to send its operating data to asset data platform 102 in a batch fashion, in which case asset data platform 102 may receive periodic transmissions of operating data from operating data source 104B (e.g., on an hourly, daily, or weekly basis). As another possibility, asset data platform 102 may receive operating data from operating data source 104B in a streaming fashion as such operating data is received and/or otherwise generated by operating data source 104B. As yet another possibility, asset data platform 102 may receive operating data from operating data source 104B in response to sending a request for such data to operating data source 104B, in which case asset data platform 102 may be configured to periodically send requests for operating data to operating data source 104B. As still another possibility, asset data platform 102 may receive operating data from operating data source 104B by accessing an Application Programming Interface (API) that has been made available by operating data source 104B, subscribing to a service provided by operating data source 104B, or the like. Asset data platform 102 may be configured to receive operating data from operating data source 104B in other manners as well.

Yet another type of data source 104 may take the form of an asset maintenance data source 104C, which may comprise a computing system that is configured to generate and/or receive data related to the maintenance of a plurality of assets—referred to herein as "maintenance data"—and then send this maintenance data to asset data platform 102 over the respective communication path between asset maintenance data source 104C and asset data platform 102. In this respect, asset maintenance data source 104C may take various forms. As one possibility, asset maintenance data source 104C may comprise an existing data platform of a third-party organization that is interested in tracking the maintenance of assets, such as an asset owner, asset dealer, asset manufacturer, asset repair shop, or the like. As another possibility, asset maintenance data source 104C may comprise an intermediary system that compiles asset maintenance data from multiple upstream sources (e.g., multiple repair shops) and then provides that compiled maintenance data to asset data platform 102. Asset maintenance data source 104C may take other forms as well.

The asset maintenance data that is maintained and sent by asset maintenance data source 104C may take various forms. As one example, the asset maintenance data may include details regarding inspections, maintenance, servicing, and/or repairs that have been performed or are scheduled to be performed on assets (e.g., work order data). As another example, the asset maintenance data may include details regarding known occurrences of failures at assets (e.g., date of failure occurrence, type of failure occurrence, etc.). Other examples are possible as well. As with the operating data, the asset maintenance data may also include or be associated with data indicating the origins of the asset maintenance data (e.g., source identifier, timestamp, etc.).

Further, asset data platform 102 may be configured to receive asset maintenance data from asset maintenance data source 104C in various manners, including but not limited to any of the manners discussed above with respect to operating data source 104B.

Still another type of data source 104 may take the form of environmental data source 104D, which may comprise a computing system that is configured to generate and/or receive data about an environment in which assets operate—referred to herein as "environmental data"—and then send this data to asset data platform 102 over the respective communication path between environmental data source 104D and asset data platform 102. In this respect, environmental data source 104D—and the environmental data provided thereby—may take various forms.

As one possibility, environmental data source 104D may take the form of a weather data source that provides information regarding the weather at locations where assets operate (e.g., ambient temperature, air pressure, humidity, wind direction, wind speed, etc.). As another possibility, environmental data source 104D may take the form of a geospatial data source that provides information regarding the geography and/or topology at locations where assets operate. As yet another possibility, environmental data source 104D may take the form of a satellite image data source that provides satellite imagery for locations where assets operate. Environmental data source 104D may take other forms as well.

Further, in practice, asset data platform 102 may be configured to receive environmental data from asset environmental data source 104D in various manners, including but not limited to any of the manners discussed above with respect to operating data source 104B.

Another type of data source 104 may take the form of client station 104E, which may comprise any computing device that is configured to receive user input related to the operation and/or management of assets (e.g., information entered by a park operator, a repair technician, or the like) and then send that user input to asset data platform 102 over the respective communication path between client station 104E and asset data platform 102. In this respect, client station 104E may take any of various forms, examples of which may include a desktop computer, a laptop, a netbook, a tablet, a smartphone, and/or a personal digital assistant (PDA), among other possibilities.

The user input that is entered into client station 104E and sent to asset data platform 102 may comprise various different kinds of information, including but not limited to the kinds of information discussed above with respect to the other data sources. For instance, as one possibility, the user input may include certain kinds of operating data, maintenance data, and/or environmental data that may be input into asset data platform 102 by a user rather than being received from one of the aforementioned data sources. As another possibility, the user input may include certain user-defined settings or logic that is to be used by asset data platform 102 when performing data ingestion and/or data analytics operations. The user input that is entered into client station 104E and sent to asset data platform 102 may take various other forms as well.

The aforementioned data sources 104 are merely provided for purposes of illustration, and it should be understood that the asset data platform's data sources may take various other forms as well. For instance, while FIG. 1 shows several different types of data sources 104, it should be understood that asset data platform 102 need not be configured to receive asset-related data from all of these different types of data sources, and in fact, asset data platform 102 could be configured to receive asset-related data from as little as a single data source 104. Further, while data sources 104A-E have been shown and described separately, it should be understood that these data sources may be combined together as part of the same physical computing system (e.g., an organization's existing data platform may serve as both operating data source 104B and maintenance data source 104C). Further yet, it should be understood that asset data platform 102 may be configured to receive other types of data related to the operation and/or management of assets as well, examples of which may include asset management data (e.g., operational plans), enterprise data (e.g., point-of-sale (POS) data, customer relationship management (CRM) data, enterprise resource planning (ERP) data, etc.), and/or financial markets data, among other possibilities.

As shown in FIG. 1, asset data platform 102 may also be configured to output asset-related data and/or instructions for receipt by one or more output systems 106. These output systems—and the data and/or instructions provided to such output systems—may take various forms. To illustrate, FIG. 1 shows some representative examples of output systems 106 that may receive asset-related data and/or instructions from asset data platform 102, which are discussed in further detail below. However, it should be understood that these example output systems are merely provided for purposes of illustration, and that asset data platform 102 may be configured to output asset-related data and/or instructions to other types of output systems as well.

For instance, one type of output system 106 may take the form of client station 106A, which may comprise any computing device that is configured to receive asset-related data from asset data platform 102 over the respective communication path between client station 106A and asset data platform 102 and then present such data to a user (e.g., via a front-end application that is defined by asset data platform 102). In this respect, client station 106A may take any of various forms, examples of which may include a desktop computer, a laptop, a netbook, a tablet, a smartphone, and/or a PDA, among other possibilities. Further, it should be understood that client station 106A could either be a different device than client station 104E or could be the same device as client station 104E.

The asset-related data that is output for receipt by client station 106A may take various forms. As one example, this asset-related data may include a restructured version of asset-related data that was received by asset data platform 102 from one or more data sources 104 (e.g., operating data, maintenance data, etc.). As another example, this asset-related data may include data that is generated by asset data platform 102 based on the asset-related data received from data sources 104, such as data resulting from the data analytics operations performed by asset data platform 102 (e.g., predicted failures, recommendations, alerts, etc.). Other examples are possible as well.

Along with the asset-related data that is output for receipt by client station 106A, asset data platform 102 may also output associated data and/or instructions that define the visual appearance of a front-end application (e.g., a graphical user interface (GUI)) through which the asset-related data is to be presented on client station 106A. Such data and/or instructions for defining the visual appearance of a front-end application may take various forms, examples of which may include Hypertext Markup Language (HTML), Cascading Style Sheets (CSS), and/or JavaScript, among other possibilities. However, depending on the circumstance, it is also possible that asset data platform 102 may output asset-related data to client station 106A without any associated data and/or instructions for defining the visual appearance of a front-end application.

Further, client station 106A may receive asset-related data from asset data platform 102 in various manners. As one possibility, client station 106A may send a request to asset data platform 102 for certain asset-related data and/or a certain front-end application, and client station 106A may then receive asset-related data in response to such a request. As another possibility, asset data platform 102 may be configured to "push" certain types of asset-related data to client station 106A, such as scheduled or event-based alerts, in which case client station 106A may receive asset-related data from asset data platform 102 in this manner. As yet another possibility, asset data platform 102 may be configured to make certain types of asset-related data available via an API, a service, or the like, in which case client station 106A may receive asset-related data from asset data platform 102 by accessing such an API or subscribing to such a service. Client station 106A may receive asset-related data from asset data platform 102 in other manners as well.

Another type of output system 106 may take the form of a data platform 106B operated by a third-party organization interested in the operation and/or management of assets, such as an asset owner, an asset dealer, an asset manufacturer, an asset repair shop, or the like. For instance, a third-party organization such as this may have its own data platform 106B that already enables users to access and/or interact with asset-related data through front-end applications that have been created by the third-party organization, but data platform 106B may not be programmed with the capability to ingest certain types of asset-related data or perform certain types of data analytics operations. In such a scenario, asset data platform 102 may be configured to output certain asset-related data for receipt by data platform 106B.

The asset-related data that is output for receipt by data platform 106B may take various forms, including but not limited any of the forms described above in connection with the output to client station 106A. However, unlike for client station 104A, the asset-related data that is output for receipt by data platform 106B typically need not include any associated data and/or instructions for defining the visual appearance of a front-end application, because data platform 106B may be performing operations on the asset-related data from asset data platform 102 beyond presenting it to a user via a front-end application.

Further, data platform 106B may receive asset-related data from asset data platform 102 in various manners, including but not limited to any of the manners discussed above with respect to client station 106A (e.g., by sending a request to asset data platform 102, having data "pushed" by asset data platform, or accessing an API or service provided by asset data platform 102).

Yet another type of output system 106 may take the form of asset 106C (or an intermediary system that is in communication with asset 106C), which may be equipped with components that are configured to receive asset-related data and/or instructions from asset data platform 102 and then act in accordance with the received data and/or instructions. In this respect, asset 106C may take any of the various forms described above, including but not limited to electric power generation equipment, transport vehicles, heavy equipment, manufacturing equipment, and/or petroleum production equipment, among other types of assets. Further, it should be understood that asset 106C could either be a different asset than asset 104A or could be the same asset as asset 104A.

The asset-related data and/or instructions that are output for receipt by asset 106C may take various forms. As one example, asset data platform 102 may be configured to send asset 106C certain data that has been generated by asset data platform 102 based on the asset-related data received from data sources 104, such as data resulting from a data analytics operation performed by asset data platform 102 (e.g., predicted failures, recommendations, alerts, etc.), in which case asset 106C may receive this data and then potentially adjust its operation in some way based on the received data. As another example, asset data platform 102 may be configured to generate and send an instruction for asset 106C to adjust its operation in some way (e.g., based on the asset-related data received from data sources 104), in which case asset 106C may receive this instruction and then potentially adjust its operation in accordance with the instruction. As yet another example, asset data platform 102 may be configured to generate and send an instruction for asset 106C to perform a data analytics operation locally at asset 106C, in which case asset 106C may receive the instruction and then locally perform the data analytics operation. In some cases, in conjunction with sending asset 106C an instruction to perform a data analytics operation, asset data platform 102 may also provide asset 106C with executable program instructions and/or program data that enable asset 106C to perform the data analytics operation (e.g., a predictive model). However, in other cases, asset 106C may already be provisioned with executable program instructions for performing the data analytics operation. Other examples are possible as well.

Further, in practice, asset 106C may receive asset-related data and/or instructions from asset data platform 102 in various manners, including but not limited to any of the manners discussed above with respect to client station 106A.

Still another type of output system 106 may take the form of work-order system 106D, which may comprise a computing system that is configured to receive asset-related data and/or instructions from asset data platform 102 over the respective communication path between work-order system 106D and asset data platform 102 and then generate a work order in accordance with the received data and/or instructions.

A further type of output system 106 may take the form of parts-ordering system 106E, which may comprise a computing system that is configured to receive asset-related data and/or instructions from asset data platform 102 over the respective communication path between parts-ordering system 106E and asset data platform 102 and then generate a parts order in accordance with the received data and/or instructions.

The aforementioned output systems 106 are merely provided for purposes of illustration, and it should be understood that output systems in communication with asset data platform 102 may take various other forms as well. For instance, while FIG. 1 shows several different types of output systems 106, it should be understood that asset data platform 102 need not be configured to output asset-related data and/or instructions for receipt by all of these different types of output systems, and in fact, asset data platform 102 could be configured to output asset-related data and/or instructions for receipt by as little as a single output system 106. Further, while output systems 106A-E have been shown and described separately, it should be understood that these output systems may be combined together as part of the same physical computing system. Further yet, it should be understood that asset data platform 102 may be configured to output asset-related data and/or instructions for receipt by other types of output systems as well.

As discussed above, asset data platform 102 may communicate with the one or more data sources 104 and one or more output systems 106 over respective communication paths. Each of these communication paths may generally comprise one or more communication networks and/or communications links, which may take any of various forms. For instance, each respective communication path with asset data platform 102 may include any one or more of point-to-point links, Personal Area Networks (PANs), Local-Area Networks (LANs), Wide-Area Networks (WANs), such as the Internet or cellular networks, cloud networks, and/or operational technology (OT) networks, among other possibilities. Further, the communication networks and/or links that make up each respective communication path with asset data platform 102 may be wireless, wired, or some combination thereof, and may carry data according to any of various different communication protocols.

Although not shown, the respective communication paths with asset data platform 102 may also include one or more intermediate systems. For example, it is possible that a given data source 104 may send asset-related data to one or more intermediary systems, such as an aggregation system, and asset data platform 102 may then be configured to receive the asset-related data from the one or more intermediary systems. As another example, it is possible that asset data platform 102 may communicate with a given output system 106 via one or more intermediary systems, such as a host server (not shown). Many other configurations are also possible.

It should be understood that network configuration 100 is one example of a network configuration in which embodiments described herein may be implemented. Numerous other arrangements are possible and contemplated herein. For instance, other network configurations may include additional components not pictured and/or more or less of the pictured components.

II. Example Platform

Figure 2:
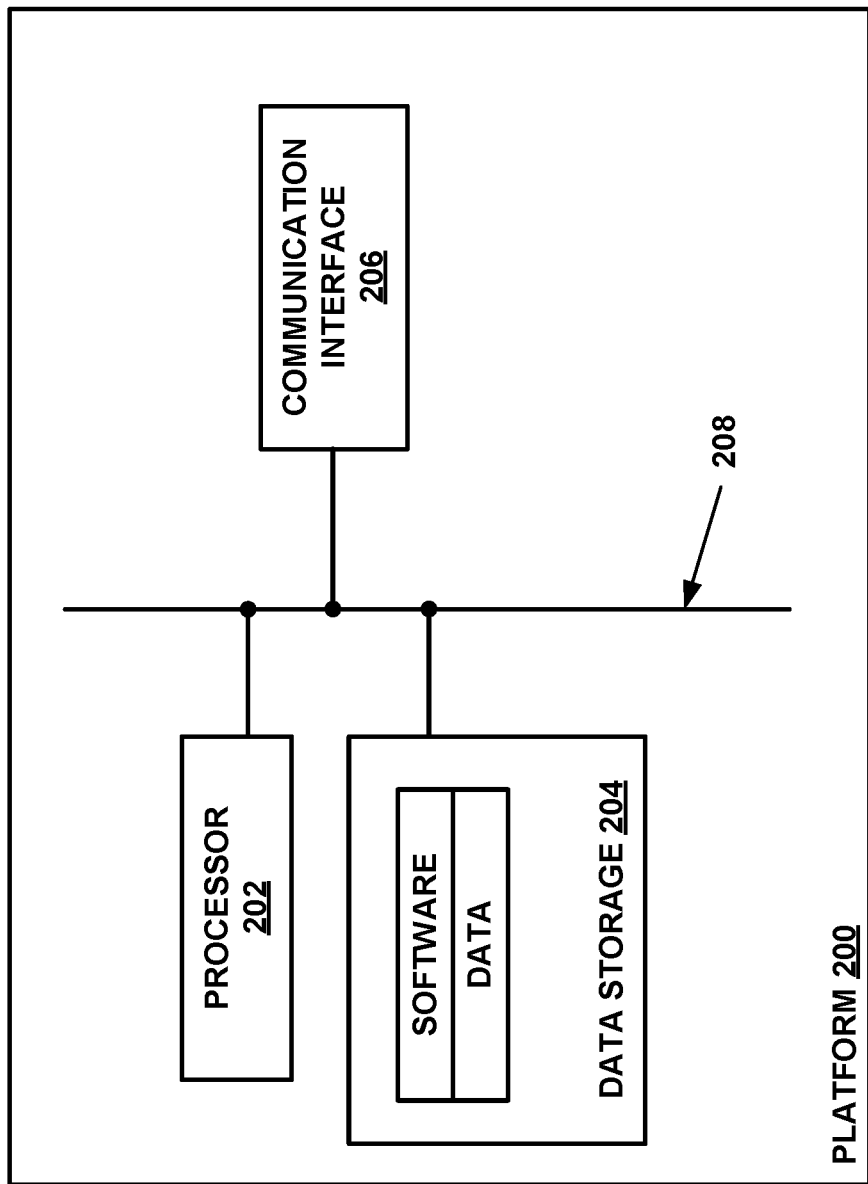
FIG. 2 depicts a simplified block diagram of an example asset data platform from a structural perspective.

FIG. 2 is a simplified block diagram illustrating some structural components that may be included in an example computing platform 200, which could serve as the asset data platform 102 in FIG. 1. In line with the discussion above, platform 200 may generally comprise one or more computer systems (e.g., one or more servers), and these one or more computer systems may collectively include at least a processor 202, data storage 204, and a communication interface 206, all of which may be communicatively linked by a communication link 208 that may take the form of a system bus, a communication network such as a public, private, or hybrid cloud, or some other connection mechanism.

Processor 202 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 202 could comprise processing components that are distributed across a plurality of physical computing devices connected via a network, such as a computing cluster of a public, private, or hybrid cloud.

In turn, data storage 204 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 204 may comprise computer-readable storage mediums that are distributed across a plurality of physical computing devices connected via a network, such as a storage cluster of a public, private, or hybrid cloud that operates according to technologies such as AWS for Elastic Compute Cloud, Simple Storage Service, etc.

As shown in FIG. 2, data storage 204 may be provisioned with software components that enable the platform 200 to carry out the functions disclosed herein. These software components may generally take the form of program instructions that are executable by the processor 202 to carry out the disclosed functions, which may be arranged together into software applications, virtual machines, software development kits, toolsets, or the like.

Further, data storage 204 may be arranged to store asset-related data in one or more databases, file systems, or the like. For example, data storage 204 may be configured to store data using technologies such Apache Cassandra, Apache Hadoop, PostgreSQL, and/or MongoDB, among other possibilities. Data storage 204 may take other forms and/or store data in other manners as well.

Communication interface 206 may be configured to facilitate wireless and/or wired communication with data sources and output systems, such as data sources 104 and output systems 106 in FIG. 1. Additionally, in an implementation where platform 200 comprises a plurality of physical computing devices connected via a network, communication interface 206 may be configured to facilitate wireless and/or wired communication between these physical computing devices (e.g., between computing and storage clusters in a cloud network). As such, communication interface 206 may take any suitable form for carrying out these functions, examples of which may include an Ethernet interface, a serial bus interface (e.g., Firewire, USB 2.0, etc.), a chipset and antenna adapted to facilitate wireless communication, and/or any other interface that provides for wireless and/or wired communication. Communication interface 206 may also include multiple communication interfaces of different types. Other configurations are possible as well.

Although not shown, platform 200 may additionally include one or more interfaces that provide connectivity with external user-interface equipment (sometimes referred to as "peripherals"), such as a keyboard, a mouse or trackpad, a display screen, a touch-sensitive interface, a stylus, a virtual-reality headset, speakers, etc., which may allow for direct user interaction with platform 200.

It should be understood that platform 200 is one example of a computing platform that may be used with the embodiments described herein. Numerous other arrangements are possible and contemplated herein. For instance, other computing platforms may include additional components not pictured and/or more or less of the pictured components.

Figure 3:
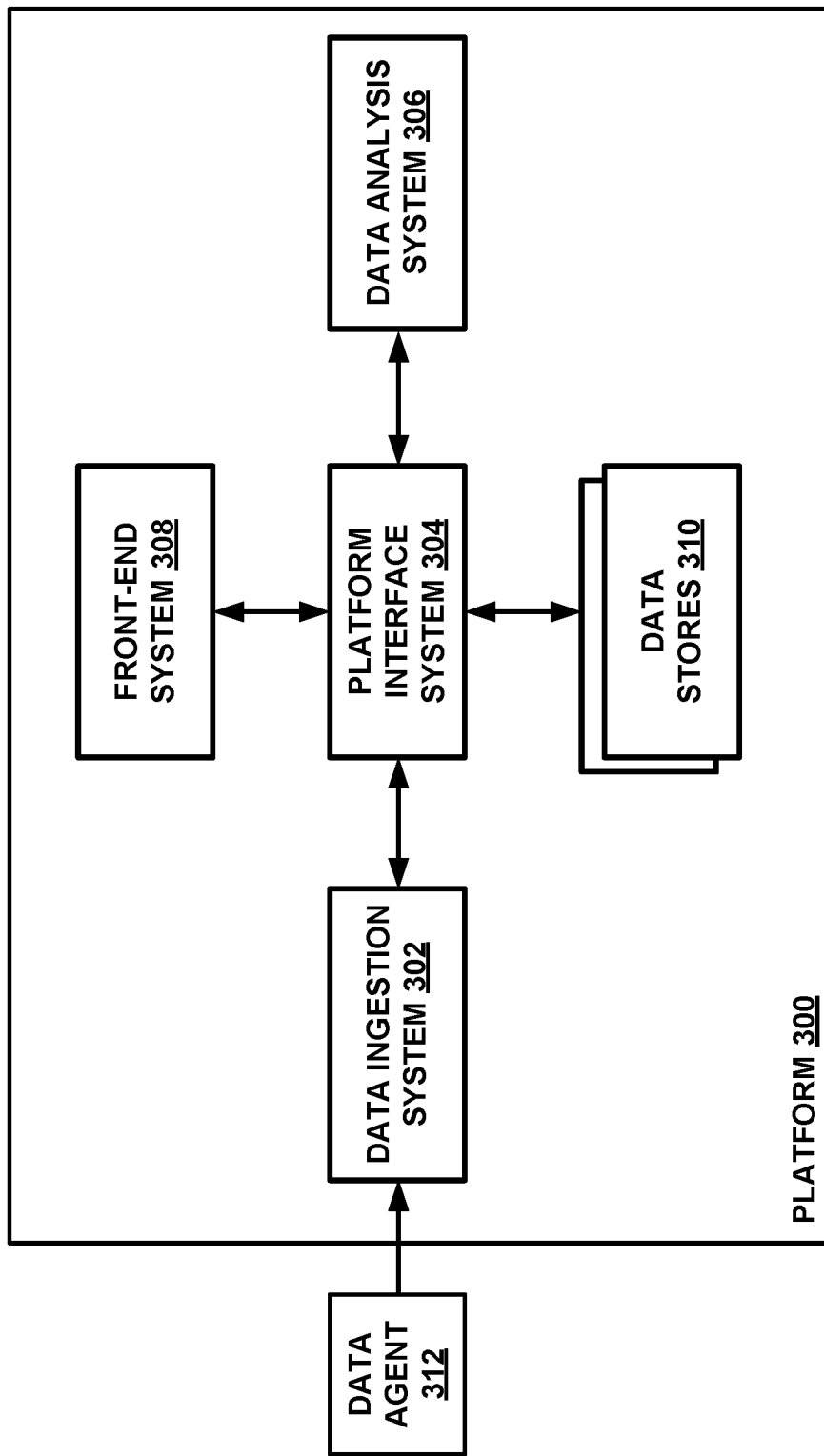
FIG. 3 depicts a simplified block diagram of an example asset data platform from a functional perspective.

Referring now to FIG. 3, another simplified block diagram is provided to illustrate some functional systems that may be included in an example platform 300. For instance, as shown, the example platform 300 may include a data ingestion system 302, a platform interface system 304, a data analysis system 306, a front-end system 308, and one or more data stores 310, each of which comprises a combination of software and hardware that is configured to carry out particular functions. In line with the discussion above, these functional systems may be implemented on one or more computing systems, which may take the form of computing infrastructure of a public, private, and/or hybrid cloud or one or more dedicated servers, among other possibilities.

At a high level, data ingestion system 302 may be configured to ingest asset-related data received from the platform's one or more data sources, transform the ingested data into a standardized structure, and then pass the ingested data to platform interface system 304. In this respect, the function of ingesting received data may be referred to as the "extraction" (or "acquisition") stage within data ingestion system 302, the function of transforming the ingested data into a desired structure may be referred to as the "transformation" stage within data ingestion system 302, and the function of passing the ingested data to platform interface system 304 may be referred to as the "load" stage within data ingestion system 302. (Alternatively, these functions may collectively be referred to as the ETL stage). In some embodiments, data ingestion system 302 may also be configured to enhance the ingested data before passing it to platform interface system 304. This function of enhancing the ingested data may be referred to as the "enhancement" stage within data ingestion system 302. However, data ingestion system 302 may take various other forms and perform various other functions as well.

At the extraction stage, data ingestion system 302 may be configured to receive and ingest various types of asset-related data from various types of data sources, including but not limited to the types of asset-related data and data sources 104 discussed above with reference to FIG. 1. Further, in line with the discussion above, data ingestion system 302 may be configured to receive asset-related data from a data source in various manners. For instance, as one possibility, data ingestion system 302 may be configured to receive batch transmissions of asset-related data from a data source. As another possibility, data ingestion system 302 may be configured to receive asset-related data from a data source in a streaming fashion. As yet another possibility, data ingestion system 302 may be configured to receive asset-related data from a data source in response to sending a request for such data to the data source, in which case data ingestion system 302 may be configured to periodically send requests for asset-related data to the data source. As still another possibility, data ingestion system 302 may receive asset-related data from a data source by subscribing to a service provided by the data source (e.g., via an API or the like). Data ingestion system 302 may be configured to receive asset-related data from a data source in other manners as well.

Before data ingestion system 302 receives asset-related data from certain data sources, there may also be some configuration that needs to place at such data sources. For example, a data source may be configured to output the particular set of asset-related data that is of interest to platform 300. To assist with this process, the data source may be provisioned with a data agent 312, which generally comprises a software component that functions to access asset-related data at the given data source, place the data in the appropriate format, and then facilitate the transmission of that data to platform 300 for receipt by data ingestion system 302. In other cases, however, the data sources may be capable of accessing, formatting, and transmitting asset-related data to platform 300 without the assistance of a data agent.

Turning to the transformation phase, data ingestion system 302 may generally be configured to map and transform ingested data into one or more predefined data structures, referred to as "schemas," in order to standardize the ingested data. As part of this transformation stage, data ingestion system 302 may also drop any data that cannot be mapped to a schema.

In general, a schema is an enforceable set of rules that define the manner in which data is to be structured in a given system, such as a data platform, a data store, etc. For example, a schema may define a data structure comprising an ordered set of data fields that each have a respective field identifier (e.g., a name) and a set of parameters related to the field's value (e.g., a data type, a unit of measure, etc.). In such an example, the ingested data may be thought of as a sequence of data records, where each respective data record includes a respective snapshot of values for the defined set of fields. The purpose of a schema is to define a clear contract between systems to help maintain data quality, which indicates the degree to which data is consistent and semantically correct.

In some implementations, data ingestion system 302 may also be configured to map and transform different types of asset-related data to different schemas. For instance, if the asset-related data received from different data sources is to be input into different types of data analytics operations that have different input formats, it may be advantageous to map and transform such asset-related data received from the different data sources to different schemas.

As part of the transformation stage, data ingestion system 302 may also be configured to perform various other quality checks on the asset-related data before passing it to platform interface system 304. For example, data ingestion system 302 may assess the reliability (or "health") of certain ingested data and take certain actions based on this reliability, such as dropping any unreliable data. As another example, data ingestion system 302 may "de-dup" certain ingested data by comparing it against data that has already been received by platform 300 and then ignoring or dropping duplicative data. As yet another example, data ingestion system 302 may determine that certain ingested data is related to data already stored in the platform's data stores (e.g., a different version of the same data) and then merge the ingested data and stored data together into one data structure or record. Data ingestion system 302 may perform other types of quality checks as well.

It should also be understood that certain data ingested by data ingestion system 302 may not be transformed to a predefined schema (i.e., it is possible that certain ingested data will be "passed through" without performing any transformation on the data), in which case platform 300 may operate on this ingested data as it exists in its original data structure.

As noted above, in some embodiments, data ingestion system 302 may also include an "enhancement" stage where data ingestion system 302 enhances the ingested data before passing it to platform interface system 304. In this respect, data ingestion system 302 may enhance the ingested data in various manners. For instance, data ingestion system 302 may supplement the ingested data with additional asset-related data that is derived by and/or otherwise accessible to platform 300. Such additional data may take various forms. As one example, if the ingested data comprises sensor data, data ingestion system 302 may be configured to supplement the sensor data with "roll-up" data and/or "features" data that is derived from the sensor data. As another possible example, data ingestion system 302 may generate and append certain "enrichments" to the ingested data, examples of which are described in U.S. application Ser. No. 16/004,652, which is incorporated by reference herein in its entirety. Data ingestion system 302 may enhance the ingested data in other manners as well.

After data ingestion system 302 has performed any appropriate transformation and/or enhancement operations on the ingested data, it may pass the ingested data to platform interface system 304, which may be configured to receive data from data ingestion system 302, store the received data in one or more of data stores 310, and make the data available for consumption by the other functional systems of platform 300—including data analysis system 306 and/or front-end system 308. In this respect, the function of passing the ingested data from data ingestion system 302 to platform interface system 304 may take various forms.

According to an example implementation, data ingestion system 302 may begin by categorizing the ingested data into separate data categories (or "domains") that are to be consumed separately by the platform's other functional systems. In turn, data ingestion system 302 may publish the data within each category to a corresponding interface (e.g., an API or the like) that is provided by platform interface system 304. However, it should be understood that other approaches for passing the ingested data from data ingestion system 302 to platform interface system 304 may be used as well, including the possibility that data ingestion system 302 may simply publish the ingested data to a given interface of platform interface system 304 without any prior categorization of the ingested data.

After platform interface system 304 receives the ingested data from data ingestion system 302, platform interface system 304 may cause that data to be stored at the appropriate data stores 310 within platform 300. For instance, in the event that platform interface system 304 is configured to receive different categories of ingested data, platform interface system 304 may be configured store data from a first category into a first data store 310, store data from a second category into a second data store 310, and so on. In addition, platform interface system 304 may store an archival copy of the ingested data into an archival data store 310. Platform interface system 304 may store the ingested data in other manners as well.

After receiving the ingested data from data ingestion system 302, platform interface system 304 may also make the ingested data available for consumption by the platform's other functional systems—including data analysis system 306 and front-end system 308. In this respect, platform interface system 304 may make the ingested data available for consumption in various manners, including through the use of message queues or the like.

After consuming data from platform interface system 304, data analysis system 306 may generally function to perform data analytics operations on such data and then pass the results of those data analytics operations back to platform interface system 304. These data analytics operations performed by data analysis system 306 may take various forms.

As one possibility, data analysis system 306 may create and/or execute predictive models related to asset operation based on asset-related data received from one or more data sources, such as predictive models that are configured to predict occurrences of failures at an asset. One example of a predictive model that may be created and executed by data analysis system 306 is described in U.S. application Ser. No. 14/732,258, which is incorporated by reference herein in its entirety.

As another possibility, data analysis system 306 may create and/or execute models for detecting anomalies in asset-related data received from one or more data sources. Some examples of anomaly detection models that may be created and executed by data analysis system 306 are described in U.S. application Ser. Nos. 15/367,012 and 15/788,622, which are incorporated by reference herein in their entirety.

As yet another possibility, data analysis system 306 may be configured to create and/or execute other types of data analytics programs based on asset-related data received from one or more data sources, examples of which include data analytics programs that evaluate asset-related data using a set of predefined rules (e.g., threshold-based rules), data analytics programs that generate predictive recommendations, data analytics programs that perform noise filtering, and data analytics programs that perform image analysis, among other possibilities.

The data analytics operations performed by data analysis system 306 may take various other forms as well.

Further, it should be understood that some of the data analytics operations discussed above may involve the use of machine learning techniques, examples of which may include regression, random forest, support vector machines (SVM), artificial neural networks, Naïve Bayes, decision trees, dimensionality reduction, k-nearest neighbor (kNN), gradient boosting, clustering, and association, among other possibilities.

As discussed above, after performing its data analytics operations, data analysis system 306 may then pass the results of those operations back to platform interface system 304, which may store the results in the appropriate data store 310 and make such results available for consumption by the platform's other functional systems—including data analysis system 306 and front-end system 308.

In turn, front-end system 308 may generally be configured to drive front-end applications that may be presented to a user via a client station (e.g., client station 106A). Such front-end applications may take various forms. For instance, as discussed above, some possible front-end applications for platform 300 may include an asset performance management application, an asset fleet management application, a service optimization application, and/or an asset dealer operations application, among other possibilities.

In practice, front-end system 308 may generally function to access certain asset-related data from platform interface system 304 that is to be presented to a user as part of a front-end application and then provide such data to the client station along with associated data and/or instructions that define the visual appearance of the front-end application. Additionally, front-end system 308 may function to receive user input that is related to the front-end applications for platform 300, such as user requests and/or user data. Additionally yet, front-end system 308 may support a software development kit (SDK) or the like that allows a user to create customized front-end applications for platform 300. Front-end system 308 may perform other functions as well.

Platform 300 may also include other functional systems that are not shown. For instance, although not shown, platform 300 may include one or more additional functional systems that are configured to output asset-related data and/or instructions for receipt by other output systems, such as third-party data platforms, assets, work-order systems, parts-ordering systems, or the like.

One of ordinary skill in the art will appreciate that the example platform shown in FIGS. 2-3 is but one example of a simplified representation of the structural components and/or functional systems that may be included in a platform, and that numerous others are also possible. For instance, other platforms may include structural components and/or functional systems not pictured and/or more or less of the pictured structural components and/or functional systems. Moreover, a given platform may include multiple, individual platforms that are operated in concert to perform the operations of the given platform. Other examples are also possible.

III. Example Wind Site

As discussed above with reference to FIG. 1, asset data platform 102 may be configured to perform functions to facilitate the monitoring, analysis, and/or management of various types of assets, such as wind turbines. Typically, a plurality of wind turbines is installed at a wind site (i.e., a "wind farm" or "wind park") that is arranged at a geographical location that experiences windy conditions and provides electricity to an existing power grid.

Figure 4A:
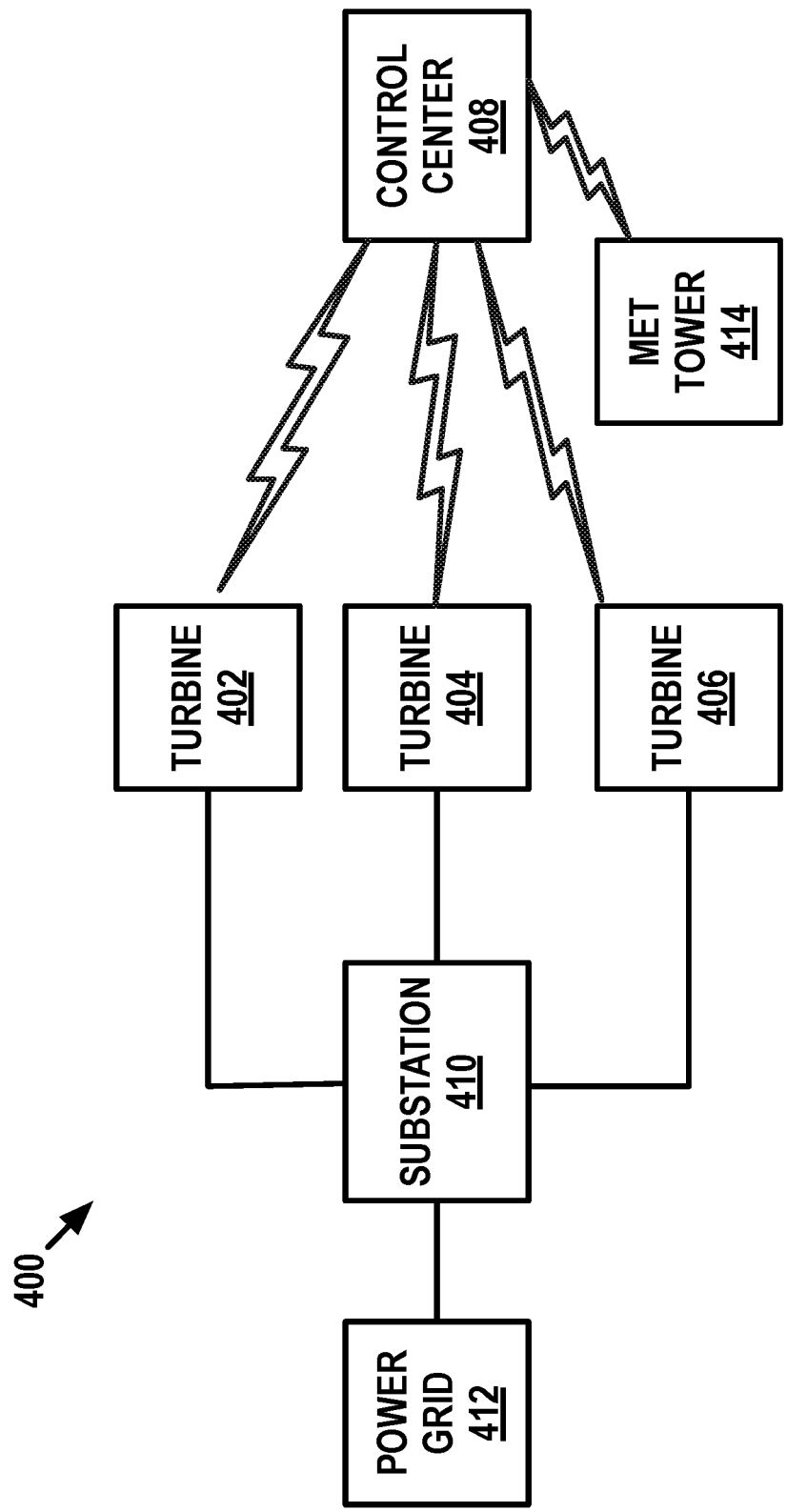
FIG. 4A depicts a simplified block diagram of an example wind site that is coupled to a power grid.

To illustrate, FIG. 4A provides a simplified block diagram of an example wind site 400 that is coupled to a power grid 412. As shown in FIG. 4A, wind site 400 may include one or more wind turbines 402, 404, and 406, at least one control center 408, at least one substation 410, and at least one meteorological evaluation (MET) tower 414. Wind site 400 may be coupled to power grid 412 via substation 410. It should be understood that wind site 400 may include additional components not shown and/or more or less of the depicted components. For instance, in example embodiments, wind site 400 may include multiple control centers or may not include a MET tower. Other example wind site configurations are also possible.

Generally, each wind turbine 402-406 is configured to convert wind energy into electricity that is provided to substation 410 via a wired connection, such as a transmission line. Substation 410 in turn provides that electricity to power grid 412. Wind turbines are discussed in further detail below with reference to FIG. 4B.

In practice, wind site 400's turbines 402-406 may be distributed across a geographical area that includes a uniform or variable topography. Moreover, the geographical area may be of a size such that environmental conditions may vary across the geographical area. For example, some portion of the geographical area may experience wind patterns, wind speeds, temperature, humidity, etc. that differ from other portions of the geographical area. Accordingly, at any given point in time, some of wind turbines 402-406 of wind site 400 may experience one or more environmental conditions in a different manner than other wind turbines, which may result in one wind turbine generating more electricity than other wind turbines and/or one wind turbine being deactivated while others continue to produce electricity.

In general, control center 408 may be configured to manage the operation of wind turbines 402-406. For example, control center 408 may be configured to send commands that cause certain wind turbines to activate or deactivate (i.e., attempt to capture wind energy or not). To facilitate this and other functions, control center 208 may include hardware components such as at least one processor, data storage, and at least one communication interface, all of which may be communicatively linked by a communication link that may take the form of a system bus, a communication network, or some other connection mechanism.

The at least one processor may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In turn, the data storage may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. The data storage may be provisioned with software components that enable control center 408 to carry out its functions. These software components may generally take the form of program instructions that are executable by the at least one processor to carry out functions, which may be arranged together into software applications, virtual machines, software development kits, toolsets, or the like. Further, the data storage may be arranged to store turbine-related data in one or more databases, file systems, or the like.

The at least one communication interface may be configured to facilitate wireless and/or wired communication with turbines 402-406, MET tower 414, and/or asset data platform 102 of FIG. 1, among other devices and systems. For example, control center 408 may collect wind-turbine data (e.g., operating data originating from a wind turbine) from some or all of the wind turbines 402-406, as well as meteorological data from MET tower 414, and perhaps maintain that data in data storage. Moreover, control center 408 may provide wind-turbine and/or meteorological data to asset data platform 102. As such, the at least one communication interface may take any suitable form for carrying out these functions, examples of which may include an Ethernet interface, a serial bus interface, a chipset and antenna adapted to facilitate wireless communication, and/or any other interface that provides for wireless and/or wired communication. The at least one communication interface may also include multiple communication interfaces of different types. Other configurations are possible as well.

As mentioned before, substation 410 may be electrically coupled to wind turbines 402-406 and may be generally configured to collect electricity from wind turbines 402-406 and provide that electricity to power grid 412. To facilitate these operations, substation 410 may include one or more electricity collection systems, one or more transformers (e.g., one or more step-up transformers), and infrastructure for coupling substation 410 to power grid 412, among other components. Moreover, substation 410 may be configured to provide to control center 408 respective electricity-production data for each wind turbine 402-406 indicating how much electricity each turbine is generating at any given time.

Power grid 412 may generally include infrastructure for providing electricity to utility companies and/or residents, among other possibilities. To help facilitate this functionality, power grid 412 may take the form of or include transmission lines configured to carry electricity to particular recipients. Power grid 412 may include additional components as well.

MET tower 414 may comprise one or more meteorological evaluation towers that are configured to capture and report meteorological conditions at wind site 400, such as wind speed, wind direction, temperature, humidity, barometric pressure, etc. measured by MET tower 414. As described above, wind site 400 may experience meteorological conditions that vary across the geographical area of wind site 400. Thus, it should be understood that MET towers may be installed at various locations around wind site 400 that experience different meteorological conditions such that these different conditions can be recorded and reported.

In one implementation, wind turbines 402-406 at wind site 400 may be configured to individually send wind-turbine data (e.g., operating data originating from a wind turbine or data originating from the wind turbine indicative of surrounding environmental conditions) to a remote data analytics platform, such as asset data platform 102. In another implementation, wind turbines 402-406 at wind site 400 may be configured to send wind-turbine data to control center 408 for wind site 400, which may be configured to aggregate the data received from wind turbines 402-406, and then send this wind-turbine data to a remote data analytics platform, such as data platform 102. In yet another implementation, wind turbines 402-406 at wind site 400 may be configured to send wind-turbine data to control center 408 for wind site 400, but control center 408 may be configured to operate as a local data analytics platform such that the wind-turbine data need not be sent to a remote data analytics platform. The wind-turbine data for the given wind site may be provided to a data analytics system in other manners as well.

In addition to receiving wind-turbine data, asset data platform 102 may also receive other data related to the operation of wind site 400. For example, data platform 102 may receive data captured by MET tower 414 installed at wind site 400, which may provide an indication of meteorological conditions at wind site 400 (e.g., wind speed, wind directions, etc.). As another example, data platform 102 may receive weather data for wind site 400 from a weather-data provider (e.g., environmental data source 104D). As yet another example, data platform 102 may receive maintenance data for wind turbines 402-406 at wind site 400 from a maintenance-data source (e.g., maintenance data source 104C). As a further example, data platform 102 may receive production data for wind turbines 402-406 at wind site 400 from substation 410 and/or power grid 412. Asset data platform 102 may receive other data related to the operation of the wind site 400 as well.

IV. Example Wind Turbine

Figure 4B:
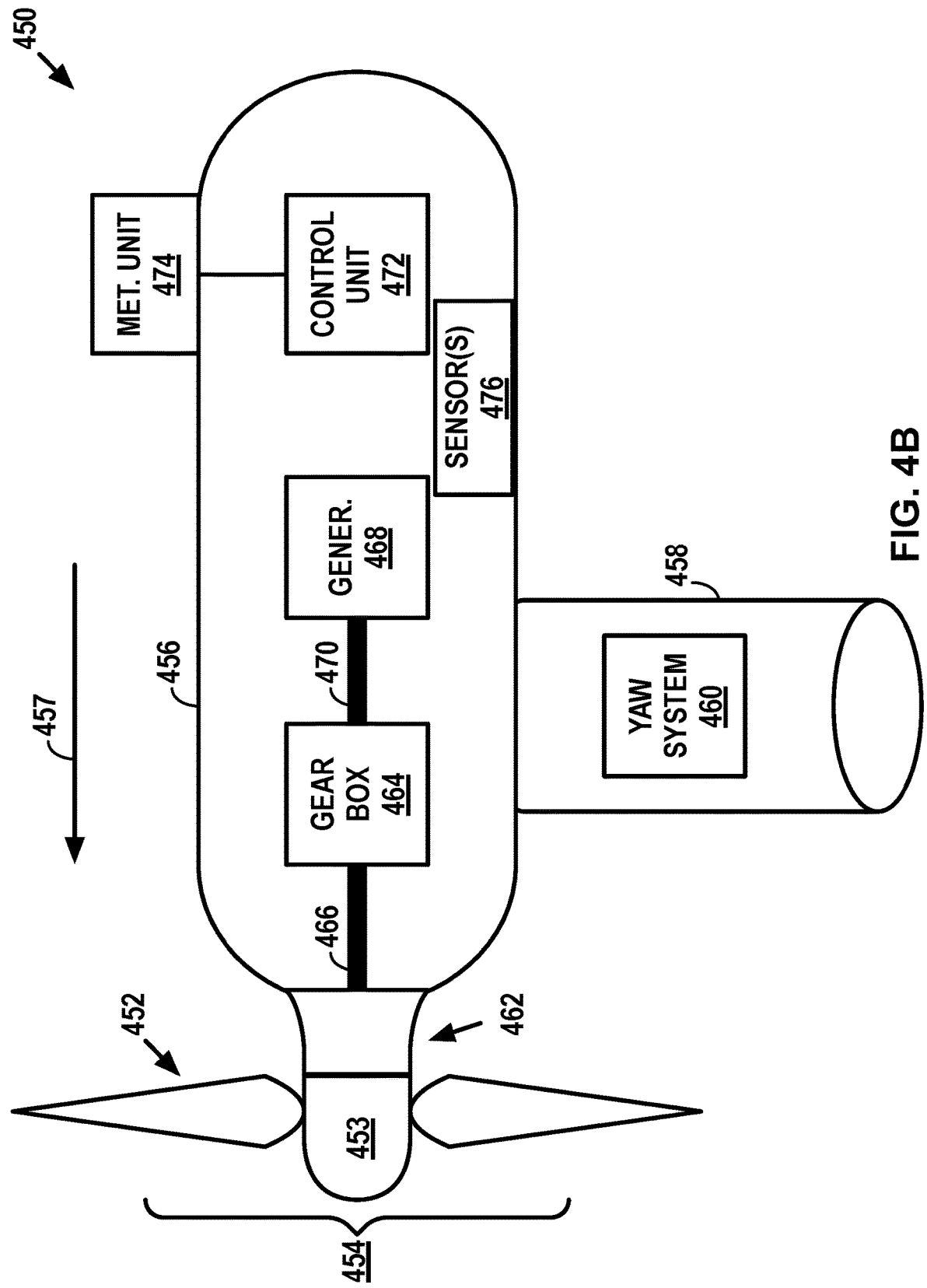
FIG. 4B depicts a simplified block diagram of an example wind turbine.

Turning to FIG. 4B, a simplified diagram of an example wind turbine 450 is depicted. Some or all of wind turbines 402-406 from FIG. 4A may be configured like wind turbine 450. As shown in FIG. 4B, wind turbine 450 includes multiple blades 452 that are mounted to a hub 453 that collectively form a rotor assembly 454 that is configured to rotate as wind passes over blades 452. Rotor 454 is connected to a nacelle 456 that sits atop a tower 458 that mounts wind turbine 450 to the ground at an installation location at a wind site.

Tower 458 may include a yaw system 460 that is generally configured to control the position of the upper structure of wind turbine 450 (e.g., rotor 454 and nacelle 456) to align the upper structure in a desired direction relative to the wind's direction. To help facilitate this functionality, yaw system 460 may include one or more motors and/or other actuators, drive shafts, gears, and control units, among other components.

Wind turbine 450 may also include a pitch system 462 that may be separate from or part of hub 453. Pitch system 462 may generally be configured to change the angle of the pitch of blades 452, collectively and/or individually, to help control the rotational speed of rotor 454, and pitch system 462 may also be configured to activate or deactivate rotor 454's ability to rotate (e.g., by engaging or disengaging a brake or the like). To help facilitate these operations, pitch system 462 may include one or more motors and/or other actuators, drive shafts, brakes, and control units, among other components.

Wind turbine 450 may include a number of subsystems within or atop of nacelle 456. As shown in FIG. 4B, hub 453 of rotor assembly 454 is physically coupled to a gearbox 464 via a drive shaft 466, which may take the form of a low-speed drive shaft. Gearbox 464 in turn is physically coupled to a generator 468 via a drive shaft 470, which may take the form of a high-speed drive shaft. Gearbox 464, drive shaft 466, generator 468, and drive shaft 470 collectively comprise wind turbine 450's drivetrain. Based on rotation of the drivetrain's drive shafts, generator 468 functions to generate electricity that travels on a wire (not shown) that extends down tower 458 to a substation (e.g., substation 410 of FIG. 4A).

In general, gear box 464 operates to connect drive shaft 466 to drive shaft 470. Gear box 464 may include two or more gears of differing sizes that facilitate causing drive shaft 470 to rotate at a higher rate than drive shaft 466. As a result, drive shaft 470 is configured to rotate at a rate that is sufficient to cause generator 468 to produce electricity. In some example embodiments, wind turbine 450 may not include gear box 464, such as when generator 468 is a "direct-drive" generator.

As suggested above, generator 468 is configured to convert mechanical energy into electricity. In particular, generator 468 is driven by drive shaft 470, and as drive shaft 470 rotates, generator 468 converts the mechanical energy of drive shaft 470 into electricity. Generator 468 may take the form of an induction generator, among other possibilities.

Nacelle 456 may also include a control unit 472 that generally manages the operation of wind turbine 450. Control unit 472 may include one or more processors (similar in nature to the above-discussed processors) and data storage (similar in nature to the above-discussed data storage) that includes program instructions that when executed by the one or more processors cause control unit 472 to perform various functions, some of which are described herein. Control unit 472 may be communicatively linked (either directly or indirectly) by a system bus, network, or other connection mechanism to one or more of wind turbine 450's subsystems, such as yaw system 460, pitch system 462, and/or perhaps other subsystems. Moreover, control unit 472 may be communicatively coupled to a meteorological unit 474 that sits atop of nacelle 456.

Meteorological unit 474 is generally configured to measure meteorological conditions of wind turbine 450's surroundings as those conditions are experienced at wind turbine 450's nacelle 456, such as wind speed, wind direction, air density, temperature, humidity, barometric pressure, etc. Meteorological unit 474 may include at least one wind vane (or other wind-direction sensor), an anemometer, and/or a variety of sensors configured to measure a variety of meteorological attributes. Meteorological unit 474 may output meteorological data indicative of meteorological attributes measured at wind turbine 450, which control unit 472 may be configured to maintain in data storage and/or relay to a control center or data analytics platform.

In operation, meteorological attributes measured by meteorological unit 474 may cause control unit 472 to in turn control one or more of wind turbine 450's subsystems. For example, meteorological unit 474 may provide control unit 472 data indicative of the present wind direction, which may in turn cause control unit 472 to control yaw system 460 to rotate wind turbine 450 a certain number of degrees clockwise or counterclockwise such that the wind turbine's centerline 457 that bisects nacelle 456 and points towards rotor 454 (which may be referred to herein as a "nacelle centerline") is parallel to and points towards the direction of the wind. As another example, control unit 472 may receive from meteorological unit 474 data indicative of the present wind speed, which may in turn cause control unit 472 to cause pitch system 462 to disable rotor 454 from spinning (e.g., by engaging a brake) when the wind speed is above a threshold speed. Other example operations are also possible.

Wind turbine 450 may also be outfitted with various sensors 476 that are configured to monitor various operating conditions of wind turbine 450. In some cases, two or more sensors 476 may be grouped based on a particular subsystem of wind turbine 450. In this way, a group of sensors 476 may be configured to monitor operating conditions of the particular subsystem.

In general, sensors 476 may each be configured to measure the value of a respective operating parameter of wind turbine 450 and then output data that indicates the measured value of the respective operating parameter over time. In this respect, the operating parameters of wind turbine 450 that are measured by sensors 476 may include yaw-system activities, vibrations, wind speed, wind direction, temperatures, pressures, rotational speeds, accelerations, friction, power usages, fluid levels, runtimes, voltages and currents, magnetic fields, electric fields, location, positions of components, and power generation, among other examples. At least some of the aforementioned components of wind turbine 450 may include bearings and/or fluids, such as oils, hydraulic fluids, and/or other lubricating fluids, for which sensors 476 may be provided to measure operating conditions thereof. One of ordinary skill in the art will appreciate that these are but a few example operating conditions that sensors may be configured to measure. Additional or fewer sensors may be used depending on the specific type of wind turbine.

In practice, sensors 476 may each be configured to measure the value of a respective operating parameter continuously, periodically (e.g., based on a sampling frequency), and/or in response to some triggering event. In this respect, each sensor 476 may have a respective set of operating parameters that defines how the sensor performs its measurements, which may differ on a sensor-by-sensor basis (e.g., some sensors may sample based on a first frequency, while other sensors sample based on a second, different frequency). Similarly, sensors 476 may each be configured to output data that indicates the measured value of its respective operating parameter to control unit 472 and/or perhaps a local analytics device (if one is present) continuously, periodically, and/or in response to some triggering event.

Based on the foregoing, it will be appreciated that sensors 476 may take various different forms depending the type of operating parameter being measured, among other factors. For instance, in some cases, a sensor 476 may take the form of a general-purpose sensing device that has been programmed to measure a particular type of operating parameter. In other cases, a sensor 476 may take the form of a special-purpose sensing device that has been specifically designed to measure a particular type of operating parameter (e.g., a yaw-gear-rotation sensor, a biaxial vibration sensor, a temperature sensor, a GPS receiver, etc.). In still other cases, a sensor 476 may take the form of a special-purpose device that is not primarily designed to operate as a sensor but nevertheless has the capability to measure the value of an operating parameter as well. Sensors 476 may take other forms as well.

Returning to control unit 472, control unit 472 is configured to (i) receive data from wind turbine 450's subsystems (e.g., sensor data, electricity-production data, meteorological data, etc.), (ii) store the data in data storage, (iii) access the stored data, and/or (iv) transmit the data to a variety of recipient systems, such as control center 408 of FIG. 4A and/or asset data platform 102 of FIG. 1, among other possibilities. In some embodiments, control unit 472 may include a wireless network interface that facilitates control unit 472 transmitting such data wirelessly.

As one example, control unit 472 may be configured to "push" data to asset data platform 102, directly or indirectly, either according to a schedule or in response to a triggering event (e.g., a certain amount of data has been collected). As another example, asset data platform 102 may be configured to "pull" data from control unit 472, directly or indirectly, either according to a schedule or in response to a triggering event. Other examples of asset data platform 102 obtaining operating data for a given wind turbine 450 are possible as well, including the possibility that asset data platform 102 may receive the data from wind turbine 450 indirectly via an intermediate entity (e.g., control center 408 of FIG. 4A).

Additionally, control unit 472 may be configured to receive data from any of wind turbine 450's subsystems, control center 408 of FIG. 4A, and/or asset data platform 102 of FIG. 1, and based on such data, cause an operation to occur at wind turbine 450. For instance, control unit 472 may receive a control instruction from asset data platform 102, directly or indirectly, that causes control unit 472 to modify the operation of yaw system 460. Other examples are possible as well.

In some circumstances, it may also be desirable to perform certain data analytics operations locally at wind turbine 450, rather than relying on a central platform to perform data analytics operations. Indeed, performing data analytics operations locally at wind turbine 450 may reduce the need to transmit operating data to a centralized platform, which may reduce the cost and/or delay associated with performing data analytics operations at the central platform and potentially also increase the accuracy of certain data analytics operations, among other advantages.

In this respect, in some cases, the aforementioned on-board components of wind turbine 450 (e.g., control unit 472) may provide sufficient computing power to locally perform data analytics operations at wind turbine 450, in which case data storage may be provisioned with executable program instructions and associated program data for performing the data analytics operations. However, in other cases, the aforementioned on-board components of wind turbine 450 (e.g., control unit 472) may not provide sufficient computing power to locally perform certain data analytics operations at wind turbine 450. In such cases, wind turbine 450 may also optionally be equipped with a local analytics device, which may comprise a computing device that is capable of performing data analytics operations and other complex operations that go beyond the capabilities of wind turbine 450's other on-board components. In this way, the local analytics device may generally serve to expand the on-board capabilities of wind turbine 450. The details regarding an exemplary local analytics device can be found in U.S. patent application Ser. No. 14/963,207, which is herein incorporated by reference in its entirety.

Although wind turbine 300 is illustrated as an upwind wind turbine, this is for example and explanation purposes only. It should be understood that other wind turbine types, such as downwind wind turbines, could be used instead or as well as the exemplary downwind turbine shown in FIG. 4B. Moreover, one of ordinary skill in the art will appreciate that FIGS. 4A-4B merely show one example of some aspects of a wind site and a wind turbine and that numerous other examples are also possible. For instance, a wind turbine may include additional components not pictured, may have more or less of the pictured components, and/or the aforementioned components may be arranged and/or integrated in a different manner. Further, one of ordinary skill in the art will appreciate that two or more depicted components may be integrated together in whole or in part. Further yet, one of ordinary skill in the art will appreciate that at least some of the components of wind turbine 450 may be affixed or otherwise added to wind turbine 450 after it has been installed at a wind site.

V. Example Operations

As noted above, in order to maximize power performance whenever the wind turbine is actively attempting to produce electricity, a wind turbine's nacelle centerline should be orientated such that the turbine is facing the wind and the plane of its blades is perpendicular to the direction of the wind. In operation, as the direction of the wind changes, a wind turbine will spend time yawing in an effort to align its nacelle centerline with the changing wind direction. As a general matter, a wind turbine's power performance is not maximized while the wind turbine is yawing to track the direction of the wind because the wind turbine's blades are not perpendicular to the direction of the wind during that period of time. Thus, from a power performance perspective, it is desirable for a wind turbine to minimize its yaw activity when tracking a changing wind direction.

Figure 5A:
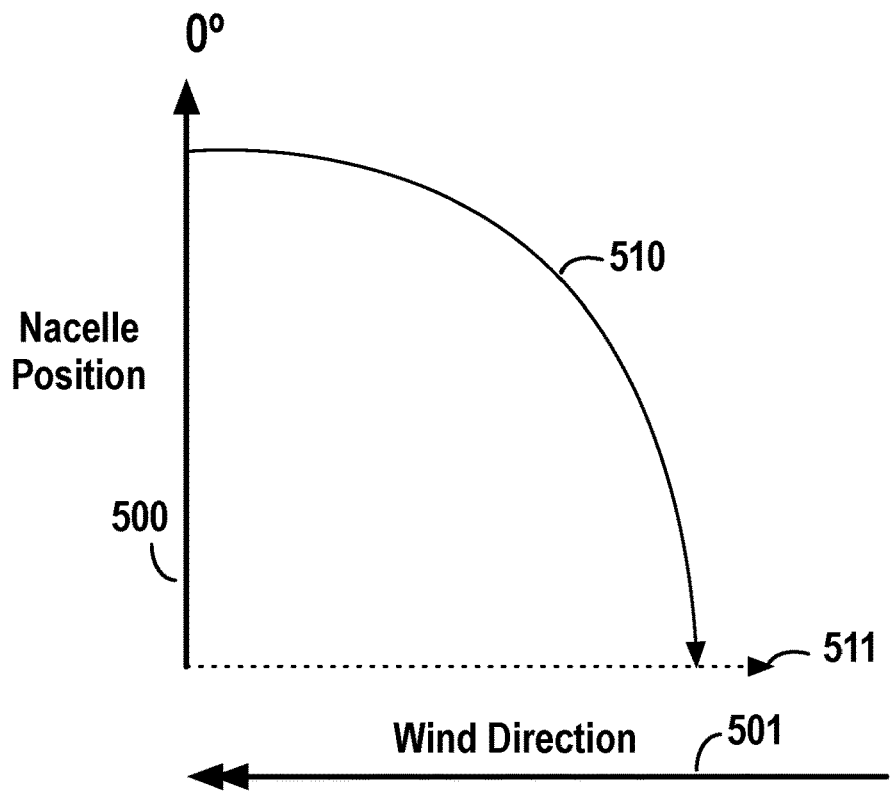
FIG. 5A provides a conceptual illustration of example wind-turbine yaw activity that efficiently tracks a change in wind direction.

To illustrate, FIG. 5A provides a conceptual illustration of wind-turbine yaw activity that efficiently tracks a change in wind direction. As shown, a wind turbine's nacelle was originally pointing north (e.g., 0°), as represented by nacelle centerline 500, and the wind's direction changed to west (e.g., 90° relative to the nacelle's centerline), as represented by wind-direction arrow 501. In this example, the wind turbine engaged in regular yaw activity by minimizing the amount of yawing it took the wind turbine to align its nacelle centerline to the wind's direction, as represented by yaw-activity arc 510 and nacelle centerline 511.

Figure 5B:
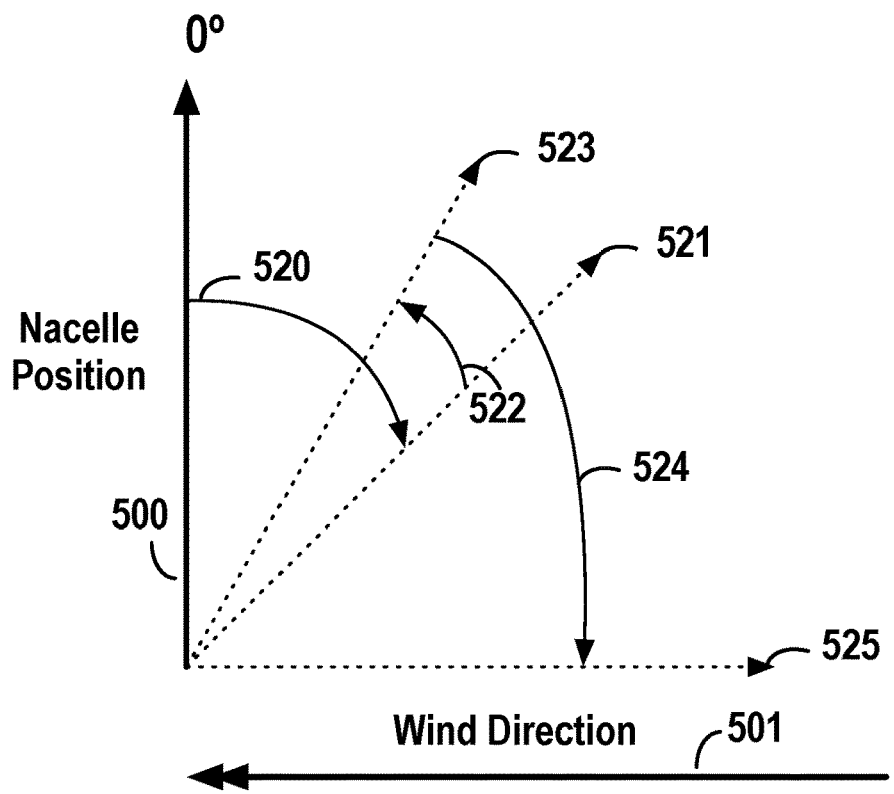
FIG. 5B provides a conceptual illustration of a wind turbine engaging in irregular yaw activity.

At times, a wind turbine may engage in irregular yaw activity relative to what the wind turbine's yaw activity should have been in order to properly track the wind's direction, such as "over-yawing" (i.e., rotating more than necessary to track the wind direction) or "under-yawing" (i.e., rotating less than necessary to track the wind direction). To illustrate, FIG. 5B provides a conceptual illustration of an example of a wind turbine engaging in irregular yaw activity (e.g., an example of "over-yawing"). As in FIG. 5A, a wind turbine's nacelle was originally pointing north (e.g., 0°), as represented by nacelle centerline 500, and the wind's direction changed to west (e.g., 90° relative to the nacelle's centerline), as represented by wind-direction arrow 501. However, in this example, the wind turbine engaged in irregular yaw activity, which involved multiple, different yaw rotations. In particular, the wind turbine first rotated clockwise (as represented by yaw-activity arc 520) until stopping (as illustrated by nacelle centerline 521), then rotated counter-clockwise (as represented by yaw-activity arc 522) until stopping (as illustrated by nacelle centerline 523), and finally rotated clockwise again (as represented by yaw-activity arc 524) until becoming aligned with the wind's direction (as illustrated by nacelle centerline 525).

In practice, irregular yaw activity may be the result of a variety of causes. For example, irregular yaw activity may be due to a malfunctioning wind vane (or other wind-direction sensor) that in turn may be the result of a variety of causes, such as a stuck wind vane (which may result in "under-yawing"), a damaged or deteriorating wind-vane component (e.g., a loose bearing or the like), or a temporary irregularity at the wind vane (e.g., a spider web or the like), among other possibilities. As another example, irregular yaw activity may be due to a malfunctioning yaw-system controller card and/or some other yaw-system electronics issue, among other possibilities. Other example causes of irregular yaw activity are also possible.

When a wind turbine engages in irregular yawing, the turbine's nacelle does not properly track the direction of the wind, which can degrade the power performance of the wind turbine (sometimes in a significant manner). Additionally, excessive yawing at a wind turbine could lead to various other downstream issues, including accelerated deterioration of the turbine's yaw system that leads to additional maintenance and/or earlier replacement of the yaw system as a whole or some of its components. In some cases, if the cause of a wind turbine's irregular yawing goes undetected for long enough, it could even eventually cause the wind turbine to shut down completely, which means increased downtime, increased repair costs, and loss of electricity production. Irregular yawing may lead to other problems at a wind turbine as well.

In view of the foregoing, there is a need for technology that is capable of detecting irregular yaw activity at a wind turbine, so that the cause of the irregular yaw activity can be identified and remedied to help avoid the negative consequences described above. However, existing technology for detecting irregular yaw activity at a wind turbine has significant drawbacks. For instance, some current approaches for detecting irregular yaw activity at a wind turbine require access to both (i) MET tower readings of wind direction and (ii) accurate readings of a wind turbine's nacelle orientation relative to true north, and in many cases, one or both of these readings will not be available and/or will not be accurate (e.g., a turbine's "true north" calibration often deteriorates over time). Other current approaches require specialized equipment (e.g., LIDAR equipment) that a human manually positions on a wind turbine to identify and correct a misaligned wind vane, but such approaches are time consuming, expensive, and merely offer a temporary fix to irregular yaw activity at a wind turbine. Yet other current approaches require retrofitting a wind turbine with specialized sensors and/or equipment after the wind turbine has been assembled and installed at a wind site and then evaluating measurements of these specialized sensors and/or equipment as a means of detecting irregular yaw activity. However, as just discussed, these current approaches are time consuming, costly, often times infeasible, prone to error, and/or reliant on post-assembly installation of specialized sensors and/or other equipment, among other disadvantages.

To help address these and other problems, the present disclosure is directed to an improved technological process for detecting irregular yaw activity at a wind turbine by determining a respective measure of yaw activity for each wind turbine in a "cluster" of wind turbines, such as the amount of "yaw distance" travelled by a turbine's nacelle while yawing or the amount of "yaw time" that a turbine's nacelle spent yawing, and then using the respective measures of yaw activity for the cluster of wind turbines to evaluate how the yaw activity for any given wind turbine in the cluster compares to the yaw activity of cluster as a whole.

Example functions that may be carried out by a data analytics platform to facilitate detecting irregular yaw activity at wind turbines will now be discussed in detail. For purposes of illustration only, the example functions are described in the context of example network configuration 100 of FIG. 1, where asset data platform 102 is a data analytics platform configured to perform some or all of the example functions described herein for detecting irregular yaw activity at wind turbines.

To help describe some of these operations, flow diagrams may also be referenced to describe combinations of operations that may be performed. In some cases, each block may represent a module or portion of program code that includes instructions that are executable by a processor to implement specific logical functions or steps in a process. The program code may be stored on any type of computer-readable medium, such as non-transitory computer-readable media. In other cases, each block may represent circuitry that is wired to perform specific logical functions or steps in a process. Moreover, the blocks shown in the flow diagrams may be rearranged into different orders, combined into fewer blocks, separated into additional blocks, and/or removed based upon the particular embodiment.

Figure 6:
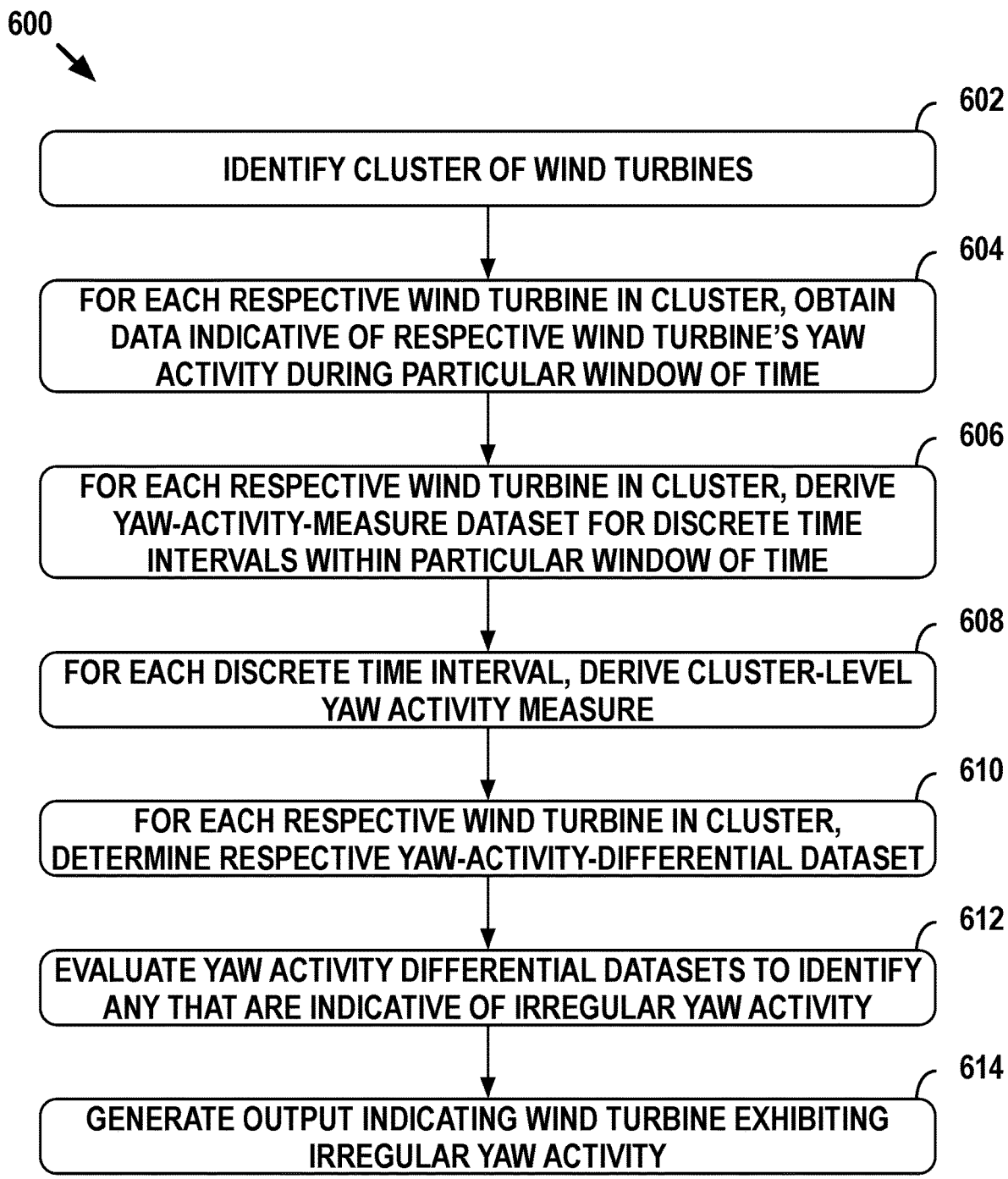
FIG. 6 is a flow diagram showing an example set of functions for detecting irregular yaw activity at wind turbines.

With reference now to flow diagram 600 of FIG. 6, asset data platform 102 may be configured to perform an example set of functions for detecting irregular yaw activity at wind turbines that generally involves (i) at block 602, identifying a cluster of two or more wind turbines at a given wind farm that are deemed to be "peers," (ii) at block 604, for each respective wind turbine in the cluster, obtaining data that is indicative of the respective wind turbine's yaw activity during a particular window of time in the past, (iii) at block 606, based on the obtained yaw-activity data, deriving a "yaw activity measure" dataset, for each respective wind turbine in the cluster, that comprises respective measures of the respective wind turbine's yaw activity during discrete time intervals within the particular window of time, (iv) at block 608, deriving a cluster-level "yaw activity measure" for each discrete time interval within the particular window of time based on the respective time-series "yaw activity measure" datasets that were derived for the wind turbines, (v) at block 610, for each respective wind turbine in the cluster, determining a respective time-series "yaw activity differential" dataset based on the derived cluster-level time-series "yaw activity measure" dataset, (vi) at block 612, evaluating the respective "yaw activity differential" dataset for each respective wind turbine in the cluster to identify any "yaw activity differential" datasets that are indicative of irregular yaw activity, and (vii) at block 614, generating an output (e.g., an alert or other notification) indicating a wind turbine exhibiting irregular yaw activity based on the evaluation. Each of these functions will now be discussed in further detail.

At block 602, asset data platform 102 may identify a cluster of two or more wind turbines at a given wind farm that are deemed to be "peers." As an initial matter, a wind farm is typically distributed across a geographical area that is large enough that meteorological conditions may vary across the area. For example, some portion of a wind farm may experience wind patterns and wind speeds that differ from other portions of the wind farm. Moreover, meteorological conditions may vary from one point in time to another such that the meteorological conditions experienced at a particular portion of the wind farm may change over time. Accordingly, while some wind turbines of a wind farm may experience one or more meteorological conditions in a different manner than other wind turbines of the wind farm, a cluster of wind turbines may experience the same or substantially similar meteorological conditions for some period of time.

Figure 7:
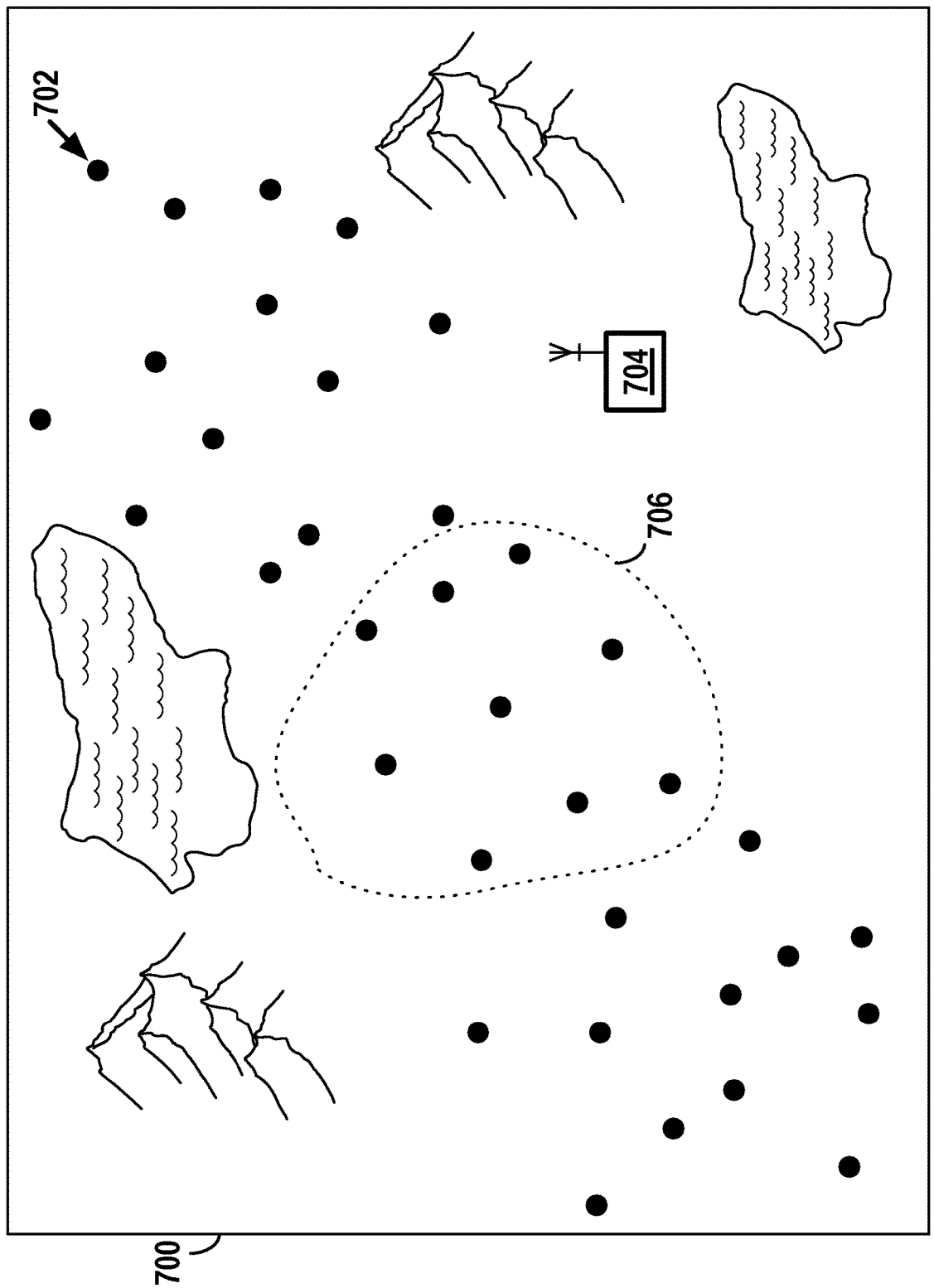
FIG. 7 provides a conceptual illustration of an example wind farm and identified cluster.

To illustrate, FIG. 7 provides a conceptual illustration of an example wind farm 700. As shown, wind farm 700 includes numerous wind turbines 702 distributed across a geographical area that, at least at times, experiences varying meteorological conditions and at least one control center 704 that is communicatively coupled to the wind turbines 702.

In example implementations, wind turbines are considered to be "peers" if they experience one or more common meteorological conditions (e.g., wind direction, wind speed, air density, etc.) during a given period of time, where two turbines may be considered to have experienced a common meteorological condition when the turbines experienced the same or substantially similar meteorological condition (e.g., within a threshold meteorological-measurement range). For example, two wind turbines may be considered peers for a given period of time if they experience substantially similar wind speeds and substantially similar wind directions (e.g., as measured by the turbines' respective meteorological units 474 of FIG. 4B) during that given period of time. However, wind turbines may be deemed peers based on other and/or additional criteria as well.

In any case, asset data platform 102 may be configured to identify a cluster of two or more wind turbines that are considered to be peers in a variety of manners. For instance, asset data platform 102 may identify a cluster of wind turbines that experienced one or more similar meteorological conditions during a given period of time (e.g., the past week) based on (i) data indicative of the geographical location of the wind turbines within a wind farm, (ii) meteorological data captured by the wind turbines within the wind farm during the given period of time, and/or (iii) weather data indicative of wind characteristics at the wind farm during the given period of time from a source outside of the wind farm, among other possibilities.

In practice, asset data platform 102 may be configured to infer that two or more wind turbines experienced at least one common meteorological condition based on one or more of these forms of data. For instance, in some cases, asset data platform 102 may infer that two or more wind turbines experienced at least one common meteorological condition based on the wind turbines' geographical location data indicating that they are proximate to one another (e.g., within a threshold distance of one another), while in other cases, asset data platform 102 may make such an inference based on geographical location data as well as meteorological data captured by the wind turbines and/or weather data. Other possibilities also exist.

Returning to FIG. 7, asset data platform 102 identified a cluster (represented by cluster circle 706) comprising a plurality of wind turbines based on the fact that each respective wind turbine of the cluster captured respective wind-direction measurements during a given period of time in the past that were within a threshold range of degrees (e.g., plus or minus 10°) of the respective measurements captured by the other wind turbines of the cluster.

Back to FIG. 6, at block 604, asset data platform 102 may obtain, for each respective wind turbine in the cluster, data that is indicative of the respective wind turbine's yaw activity (e.g., "yaw-activity" data) during a particular window of time in the past (e.g., a "lookback" window). In practice, asset data platform 102 may perform this function in a variety of manners.

As one possibility, asset data platform 102 may have previously received respective yaw-activity data for each respective wind turbine in the cluster and may then obtain that data from data storage or the like (e.g., data storage 204 of FIG. 2 or data stores 310 of FIG. 3). As another possibility, asset data platform 102 may obtain respective yaw-activity data for each respective wind turbine in the cluster from an external data source that previously received the data, such as operating data source 104B of FIG. 1. As yet another possibility, asset data platform 102 may obtain some yaw-activity data from local storage and some yaw-activity data from one or more external data sources.

In any case, the yaw-activity data for each respective wind turbine may take a variety of forms. As one possibility, yaw-activity data may take the form of time-series nacelle-position data indicating the nacelle position of the respective wind turbine at two or more points in time within the lookback window. In example implementations, nacelle-position data may be on a scale of 0 to 360 degrees relative to the nacelle centerline of the respective turbine, a scale of −720 to 720 degrees relative to the nacelle centerline of the respective turbine, or some other scale.

As another possibility, yaw-activity data may take the form of nacelle "tick" count data indicating the number of times the respective wind turbine's yaw system's gear rotated (i.e., "ticked") by one gear tooth during the lookback window. For instance, each respective wind turbine may be equipped with an encoder (or some other component) that counts the number of gear "ticks" that a respective wind turbine's yaw system rotates clockwise and/or counterclockwise.

As yet another possibility, yaw-activity data may take the form of timer-based data indicating the amount of time the respective wind turbine spent yawing during the lookback window. For instance, timer-based yawing data may indicate the total amount of time (e.g., in seconds, minutes, hours, and/or days) that a respective wind turbine spent rotating either clockwise or counterclockwise, or such data may be broken down into a clockwise-rotation amount of time and a counterclockwise-rotation amount of time, among other possibilities.

As a further possibility, yaw-activity data may take the form of time-series readings of a binary flag indicating the respective wind turbine's rotation state (e.g., rotating versus not rotating, rotating clockwise versus rotating counterclockwise, etc.). Other example forms of yaw-activity data are also possible, such as yaw-motor voltage data, among other possibilities.

Notably, in practice, not all forms of yaw-activity data may be available for each wind turbine, which may be the case within a given wind farm and even within a given cluster. In this respect, asset data platform 102 generally cannot control what forms of yaw-activity data that asset data platform 102 receives for the wind turbines in a given wind farm. Moreover, in example implementations, the amount of yaw-activity data that asset data platform 102 receives for each respective wind turbine in the cluster may vary, and asset data platform 102 generally cannot control the frequency at which any respective wind turbine samples or otherwise obtains yaw-activity data. In some cases, each respective wind turbine in the cluster may sample various forms of yaw-activity data at a respective sampling rate (that may vary across the cluster), and/or each respective wind turbine may be configured to sample various forms of yaw-activity data based on a trigger, such as a respective wind turbine's yaw system being engaged or otherwise active.

In any event, the lookback window for which asset data platform 102 obtains yaw-activity data may have the same duration as the given period of time used to identify the cluster in the first instance (e.g., the past week), or the lookback window may differ (e.g., the past 1-3 days). In practice, asset data platform 102 may be configured to define the lookback window in a variety of manners.

In some implementations, the lookback window may be predefined to a certain duration of time in the past (e.g., a certain number of days), which may be updateable based on a software update or the like for asset data platform 102. In other implementations, asset data platform 102 may dynamically define the lookback window, such as by utilizing machine learning techniques. For instance, as discussed below, asset data platform 102 may be configured to utilize machine learning to derive a predictive model that (i) receives a "yaw activity differential" dataset for a given wind turbine as its input and (ii) outputs an indication of whether that given wind turbine's "yaw activity differential" dataset is indicative of irregular yaw activity. In example implementations, a parameter of such a model may take the form of the duration (or length) of the lookback window for the yaw-activity data. In this respect, as part of a "training" phase during which asset data platform 102 derives such a model, asset data platform 102 may determine a particular lookback-window length that optimizes the performance of the model (e.g., that results in the model outputting the most accurate predictions based on historic "yaw activity differential" datasets). Other possibilities also exist.

At block 606, asset data platform 102 may, based on the obtained yaw-activity data, derive a "yaw activity measure" dataset, for each respective wind turbine in the cluster, that comprises respective measures of the respective wind turbine's yaw activity during discrete time intervals within the particular window of time. In practice, asset data platform 102 may derive a time-series "yaw activity measure" dataset for a given wind turbine based on only one form of yaw-activity data or multiple, different forms of yaw-activity data.

In example implementations, before deriving "yaw activity measure" datasets, asset data platform 102 may first identify a target length of the discrete time intervals within the lookback window, which may be performed in a variety of manners. As one possibility, the target length of the discrete time intervals may be predefined to a certain length (e.g., one-hour intervals), which may be updateable based on a software update or the like for asset data platform 102.

As another possibility, asset data platform 102 may be configured to define the target length of the discrete time intervals based on respective sampling rates of the wind turbines in the cluster. In a particular example, asset data platform 102 may (i) identify the respective rates at which each respective wind turbine in the cluster samples yaw-activity data, (ii) identify the lowest sampling rate (i.e., the wind turbine that has the longest amount of time between two consecutive yaw-activity data samples), and then (iii) define the target length of the discrete time intervals to be equivalent to an amount of time that encompasses at least two data samples obtained at the lowest sampling rate. In this way, asset data platform 102 may define a target length of the discrete time intervals that accommodates the respective sampling rates of all wind turbines in the cluster. Other possibilities for defining a target length of the discrete time intervals also exist.

Likewise, asset data platform 102 may identify a target length of the discrete time intervals within the lookback window in other manners as well.

In any case, asset data platform 102 may perform the function of deriving a wind turbine's "yaw activity measure" dataset based on obtained yaw-activity data for the wind turbine in a variety of manners, which may depend on the form of the obtained yaw-activity data, the sampling rate of yaw-activity data, and/or the target length of the discrete time intervals, among other factors.

For instance, for yaw-activity data in the form of nacelle "tick" count data, asset data platform 102 may derive a wind turbine's "yaw activity measure" dataset by (i) breaking the nacelle "tick" count data up on a discrete interval-by-interval basis and then (ii) calculating a total sum of "ticks" that occurred within each respective discrete time interval, where this calculated sum value comprises the "yaw activity measure" for the discrete time interval. In some instances, asset data platform 102 may further leverage yaw-activity data in the form of time-series readings of a binary flag indicating a respective wind turbine's rotation state (e.g., clockwise versus counterclockwise rotation) to facilitate deriving "yaw activity measures" based on nacelle "tick" count data.

For yaw-activity data in the form of timer-based data indicating an amount of time spent yawing, asset data platform 102 may derive a wind turbine's "yaw activity measure" dataset by (i) breaking the timer-based data up on a discrete interval-by-interval basis and then (ii) calculating a total amount of time (e.g., in seconds, minutes, and/or hours) that was spent yawing during each respective discrete time interval, where this calculated sum value comprises the "yaw activity measure" for the discrete time interval. In some instances, asset data platform 102 may further leverage yaw-activity data in the form of time-series readings of a binary flag indicating a respective wind turbine's rotation state (e.g., rotating versus not rotating) to facilitate deriving "yaw activity measures" based on timer-based data.

For yaw-activity data in the form of time-series nacelle-position data, asset data platform 102's approach for deriving a wind turbine's "yaw activity measure" dataset may vary depending on how the sampling rate of the nacelle-position data compares to the target length of the discrete time intervals—as that comparison may provide some indication of the risk that the wind turbine engaged in multiple, different rotations during a discrete time interval having the target length (which could in turn impact how to accurately calculate a "yaw activity measure" based on nacelle-position data).

For instance, if there is a small number of nacelle-position datapoints sampled during each discrete time period of the target length—which may indicate that the risk of a wind turbine having engaged in multiple, different rotations during a discrete time interval is relatively low—asset data platform 102's approach for deriving the "yaw activity measure" dataset for a given wind turbine may involve (i) breaking the nacelle-position dataset up on a discrete interval-by-interval basis and then (ii) calculating a difference between either (a) the maximum and minimum nacelle position within each respective discrete time interval or (b) the last and first nacelle position within each respective discrete time interval, where this calculated difference value comprises the "yaw activity measure" for the discrete time interval. In some instances, asset data platform 102 may further leverage yaw-activity data in the form of time-series readings of a binary flag indicating a respective wind turbine's rotation state (e.g., clockwise versus counterclockwise rotation) to facilitate deriving "yaw activity measures" based on nacelle-position data.

Figure 8:
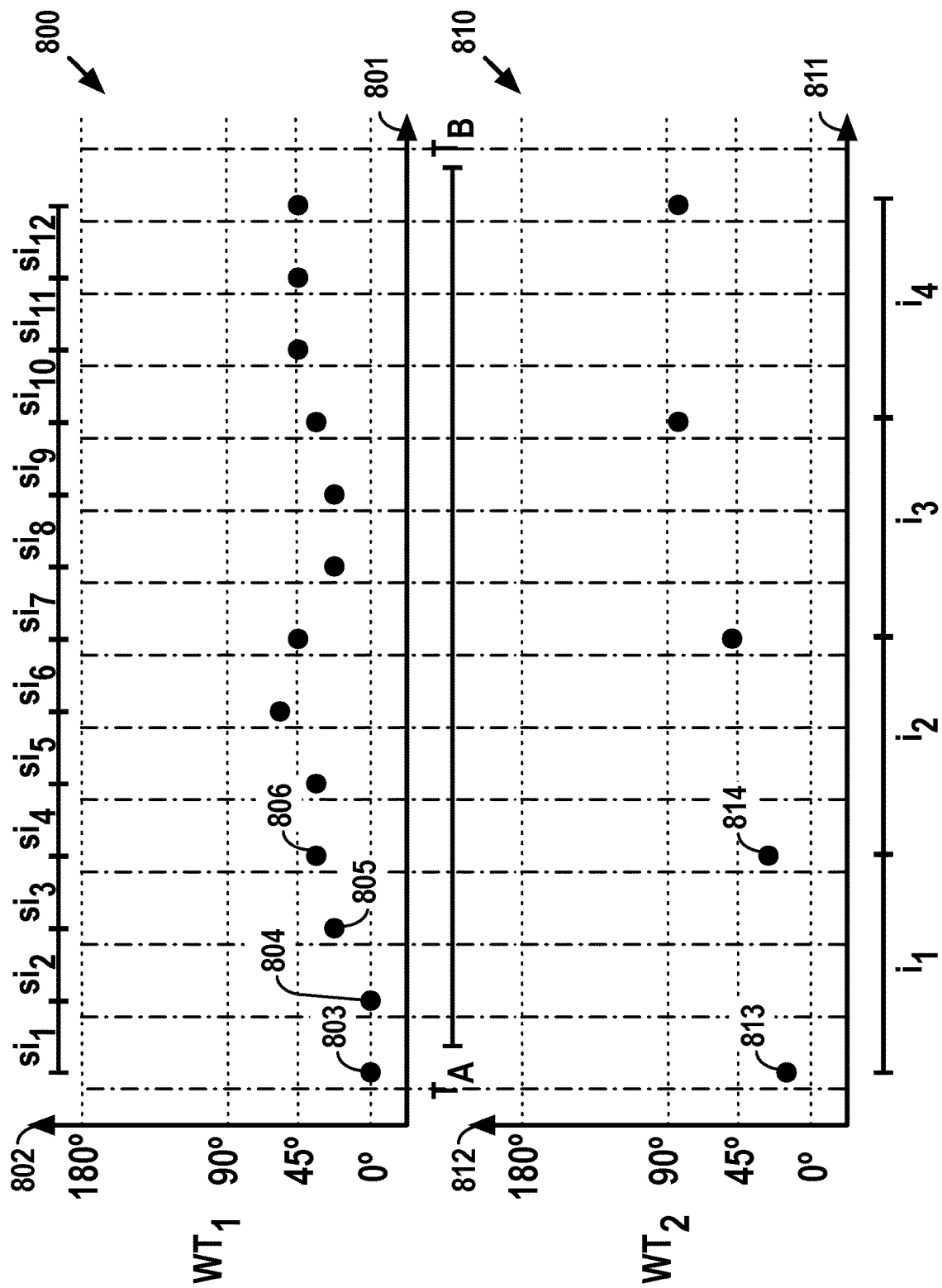
FIG. 8 provides a conceptual illustration of respective time-series nacelle-position data for two wind turbines that are part of a cluster.

To illustrate, FIG. 8 provides a conceptual illustration of respective time-series nacelle-position data for two wind turbines that are part of a cluster. In particular, data plot 800 illustrates time-series nacelle-position data for a first wind turbine of the cluster (e.g., "$WT_1$") and data plot 810 illustrates time-series nacelle-position data for a second wind turbine of the cluster (e.g., "$WT_2$"), where time is indicated by horizontal axes 801, 811 and nacelle position is indicated in degrees by vertical axes 802, 812. As shown, a lookback window is defined by a first point in time (e.g., "$T_A$") and a second point in time (e.g., "$T_B$").

In this example, the second wind turbine has a lower sampling rate than the first wind turbine, so asset data platform 102 defined a target length of the discrete time intervals (e.g., "$i_1$," "$i_2$," "$i_3$," and "$i_4$") such that each given interval accommodates two of the second wind turbine's nacelle-position datapoints. Because the second wind turbine's time-series nacelle-position data includes a small number of datapoints (e.g., two nacelle-position datapoints) during each discrete time interval (e.g., $i_1$-$i_4$), asset data platform 102's derives a "yaw activity measure" dataset for the second wind turbine by (i) breaking the nacelle-position dataset shown in data plot 810 up on a discrete interval-by-interval basis (e.g., $i_1$-$i_4$) and then (ii) calculating a difference between the respective two datapoints within each respective discrete time interval. As one example of this calculation, asset data platform 102 determines a "yaw activity measure" for discrete time interval $i_1$ by calculating the difference between the nacelle-position values of nacelle-position datapoint 814 and nacelle-position datapoint 813.

In some implementations, to help ensure that the risk of a given wind turbine having engaged in multiple, different rotations during a discrete time interval is relatively low, asset data platform 102 may be configured to (i) apply an aggregation function (e.g., averaging, identifying the median number, etc.) to derive a representative number of nacelle-position datapoints that were sampled by a given wind turbine during each discrete time period of the target length, (ii) compare that representative number to a threshold number, and (iii) apply the aforementioned approach when the representative number does not exceed the threshold number. Other manners of determining that a wind turbine's sampled nacelle-position datapoints for each discrete time period of the target length are sufficiently small in number are also possible.

On the other hand, if there is a large number of nacelle-position datapoints sampled during each discrete time period of the target length—which may indicate that the risk of a wind turbine having engaged in multiple, different rotations during a discrete time interval is relatively high—asset data platform 102's approach for deriving the "yaw activity measure" dataset for a given wind turbine may involve (i) breaking the nacelle-position dataset into sub-intervals having a length that is smaller than the target length of the discrete time intervals, (ii) calculating a difference between either (a) the maximum and minimum nacelle position within each respective sub-interval or (b) the last and first nacelle position within each respective sub-interval, and then (iii) on a discrete interval-by-interval basis, aggregating or otherwise "rolling up" the calculated difference values for the sub-intervals falling within the discrete time interval to produce a single difference value for the discrete time interval, which comprises the "yaw activity measure" for the discrete time interval.

To illustrate, returning to FIG. 8, because the first wind turbine's time-series nacelle-position data includes a relatively large number of datapoints (e.g., four nacelle-position datapoints) during each discrete time interval (e.g., $i_1$-$i_4$), asset data platform 102's derives a "yaw activity measure" dataset for the first wind turbine by (i) splitting the nacelle-position dataset shown in data plot 800 into sub-intervals (e.g., "$si_1$," "$si_2$," "$si_3$," etc. to "$si_{12}$"), (ii) calculating a difference between the respective two datapoints within each respective sub-interval, and (iii) rolling up the calculated difference values for the sub-intervals falling within the discrete time interval to produce a single difference value for the discrete time interval. As one example of these calculation and roll-up functions, asset data platform 102 determines a "yaw activity measure" for discrete time interval $i_1$ by (i) calculating the difference between the nacelle-position values of nacelle-position datapoint 804 and nacelle-position datapoint 803 for sub-interval $si_1$, the difference between the nacelle-position values of nacelle-position datapoint 805 and nacelle-position datapoint 804 for sub-interval $si_2$, and the difference between the nacelle-position values of nacelle-position datapoint 806 and nacelle-position datapoint 805 for sub-interval $si_3$, and (ii) summing the calculated differences for sub-intervals $si_1$, $si_2$, and $si_3$.

In some implementations, asset data platform 102 may perform these sub-interval functions on a given wind turbine's nacelle-position datapoints only for discrete time periods of the target length that have a large number of datapoints. For the given wind turbine's nacelle-position datapoints from other discrete time periods within the lookback wind that have a small number of datapoints, asset data platform 102 may derive "yaw activity measures" using the other approach without defining sub-intervals.

While performing calculations on time-series nacelle-position data, asset data platform 102 may also be presented with an additional challenge. As mentioned before, it is possible that the nacelle-position data may be measured on a scale of 0 to 360 degrees (rather than −720 to 720 degrees), which may obscure which direction a wind turbine rotated from one time to another and thereby inhibit asset data platform 102's ability to accurately determine the difference values between nacelle-position measurements. For example, if time-series nacelle-position data indicates a given wind turbine's nacelle position of 0 degrees at time $t_1$ and 355 degrees at time $t_2$, it is ambiguous as to whether the given wind turbine rotated clockwise 355 degrees (i.e., a difference value of 355) or rotated counterclockwise 5 degrees between $t_1$ and $t_2$ (i.e., a difference value of 5). To address this ambiguity, asset data platform 102 may be configured such that, while calculating a difference between two nacelle positions during a time interval of interest (e.g., a discrete time interval or sub-interval thereof), asset data platform 102 may apply an assumption that a wind turbine cannot rotate by more than 180 degrees during the time interval and then "normalize" any calculated difference that is greater than 180 degrees to reflect this assumption (e.g., by adding or subtracting 360).

It should be understood that asset data platform 102's approach for deriving the "yaw activity measure" dataset for a given wind turbine may take other forms as well—including the possibility that asset data platform 102 may adjust the target length of the discrete time intervals in view of the form and/or sampling rate of the obtained yaw-activity data.

As mentioned before, asset data platform 102 may derive a time-series "yaw activity measure" dataset for a given wind turbine based on multiple, different forms of yaw-activity data. In some implementations in which asset data platform 102 utilizes multiple, different forms of yaw-activity data, asset data platform 102 may convert the different forms of yaw-activity data into a common "yaw distance" measurement unit. For example, asset data platform 102 may convert (i) time-series nacelle-position data into a common "yaw distance" measurement unit by converting degrees to arc length, (ii) nacelle "tick" count data into the common "yaw distance" measurement unit by converting ticks into arc length, and (iii) timer-based data indicating an amount of time spent yawing into the common "yaw distance" measurement unit by converting time into arc length, such as by referencing the given wind turbine's rotation speed during that time spent yawing. Other manners of converting different forms of yaw-activity data into a common "yaw distance" measurement unit are also possible.

In example embodiments, asset data platform 102 may be configured such that the function of deriving a time-series "yaw activity measure" dataset for at least some respective wind turbines in the cluster may also involve filtering data from their respective dataset. This filtering function may take various forms.

For instance, as one possibility, asset data platform 102 may filter at least one respective wind turbine's "yaw activity measure" dataset to remove data corresponding to yaw activity for any periods of time during which that particular wind turbine may have been shutdown or otherwise intentionally configured to not track the wind's direction (which may be referred to as turbine "downtime"). To that end, asset data platform 102 may filter a given wind turbine's "yaw activity measure" dataset based on a variety of other data related to the operation of the given wind turbine.

As one possibility, asset data platform 102 may filter a given wind turbine's "yaw activity measure" dataset based on energy-production data indicating that the given wind turbine was producing less than a threshold level of power, which asset data platform 102 infers is indicative of a period of turbine-specific downtime.

As another possibility, asset data platform 102 may filter a given wind turbine's "yaw activity measure" dataset based on blade-pitch data indicating that the given wind turbine's blade angle was outside a threshold angle range that typically corresponds to a turbine in "normal" operation, which asset data platform 102 infers is indicative of an untwisting event taking place at the given wind turbine or other human-intervention event taking place at the given wind turbine (e.g., a human "derating" the turbine, making a repair to the turbine, etc.). In some implementations, asset data platform 102 may make such an inference when a given wind turbine's blade angle is outside of the range of −2 to 5 degrees for a turbine with a pitch-angle range of −2 to 90 degrees or when a given wind turbine's blade angle is greater than −10 degrees for a turbine with a pitch-angle range of −90 to 0 degrees, among other possibilities. Other examples of data that may be used for turbine-specific filtering are also possible.

As another possibility, asset data platform 102 may filter each respective wind turbine's "yaw activity measure" dataset to remove data corresponding to yaw activity for any periods of time during which the cluster as a whole may have been shutdown or otherwise intentionally configured to not track the wind's direction (which may be referred to as cluster "downtime"). To that end, asset data platform 102 may filter each respective wind turbine's "yaw activity measure" dataset based on a variety of other data related to the operation of the cluster.

As one possibility, asset data platform 102 may filter each respective wind turbine's "yaw activity measure" dataset based on weather data for the cluster's geographic location satisfying criteria that is indicative of an icing event or other weather event at the cluster typically associated with cluster-wide downtime, which asset data platform 102 infers is indicative of a period of cluster-wide downtime.

As another possibility, asset data platform 102 may filter a given wind turbine's "yaw activity measure" dataset based on energy-production data indicating that a threshold extent of the wind turbines in the cluster (e.g., 50%) were producing less than a threshold level of power, which asset data platform 102 infers is indicative of a period of cluster-wide downtime. Other examples of data that may be used for cluster-wide filtering are also possible.

In some implementations, one or more filter thresholds may be defined and/or adjusted utilizing machine learning techniques, which may be performed on a turbine-by-turbine or cluster-wide basis. For example, asset data platform 102 may define a threshold blade-pitch angle or a range of blade-pitch angles that define when a wind turbine is deemed to be in "normal" operation using a machine learning technique. For instance, as discussed below, asset data platform 102 may be configured to utilize machine learning to derive a predictive model that (i) receives a "yaw activity differential" dataset for a given wind turbine as its input and (ii) outputs an indication of whether that given wind turbine's "yaw activity differential" dataset is indicative of irregular yaw activity. In example implementations, a parameter of such a model may take the form of a wind turbine's blade-pitch angle. In this respect, as part of a "training" phase during which asset data platform 102 derives such a model, asset data platform 102 may determine a particular threshold blade-pitch angle or a range of blade-pitch angles that optimizes the performance of the model (e.g., that results in the model outputting the most accurate predictions based on historic "yaw activity differential" datasets). Other possibilities also exist.

Asset data platform 102 may filter the "yaw activity measure" datasets for the wind turbines in the cluster in other manners as well.

Returning to FIG. 6, at block 608, asset data platform 102 may derive a cluster-level "yaw activity measure" for each discrete time interval within the lookback window based on the derived time-series "yaw activity measure" datasets for the cluster. In practice, asset data platform 102 may perform this operation in a variety of manners.

As one possibility, asset data platform 102 may evaluate the turbine-level "yaw activity measure" datasets on an interval-by-interval basis, and for each such time interval, asset data platform 102 may apply an aggregation function (e.g., averaging, identifying the median value, etc.) to the turbine-level "yaw activity measures" for the time interval across the cluster of wind turbines in order to derive a cluster-level "yaw activity measure" for the time interval. Thus, by performing this operation for each discrete time interval within the lookback window, asset data platform 102 may produce a cluster-level "yaw activity measure" dataset. Other manners of deriving a cluster-level "yaw activity measure" dataset are also possible.

Figure 9A:
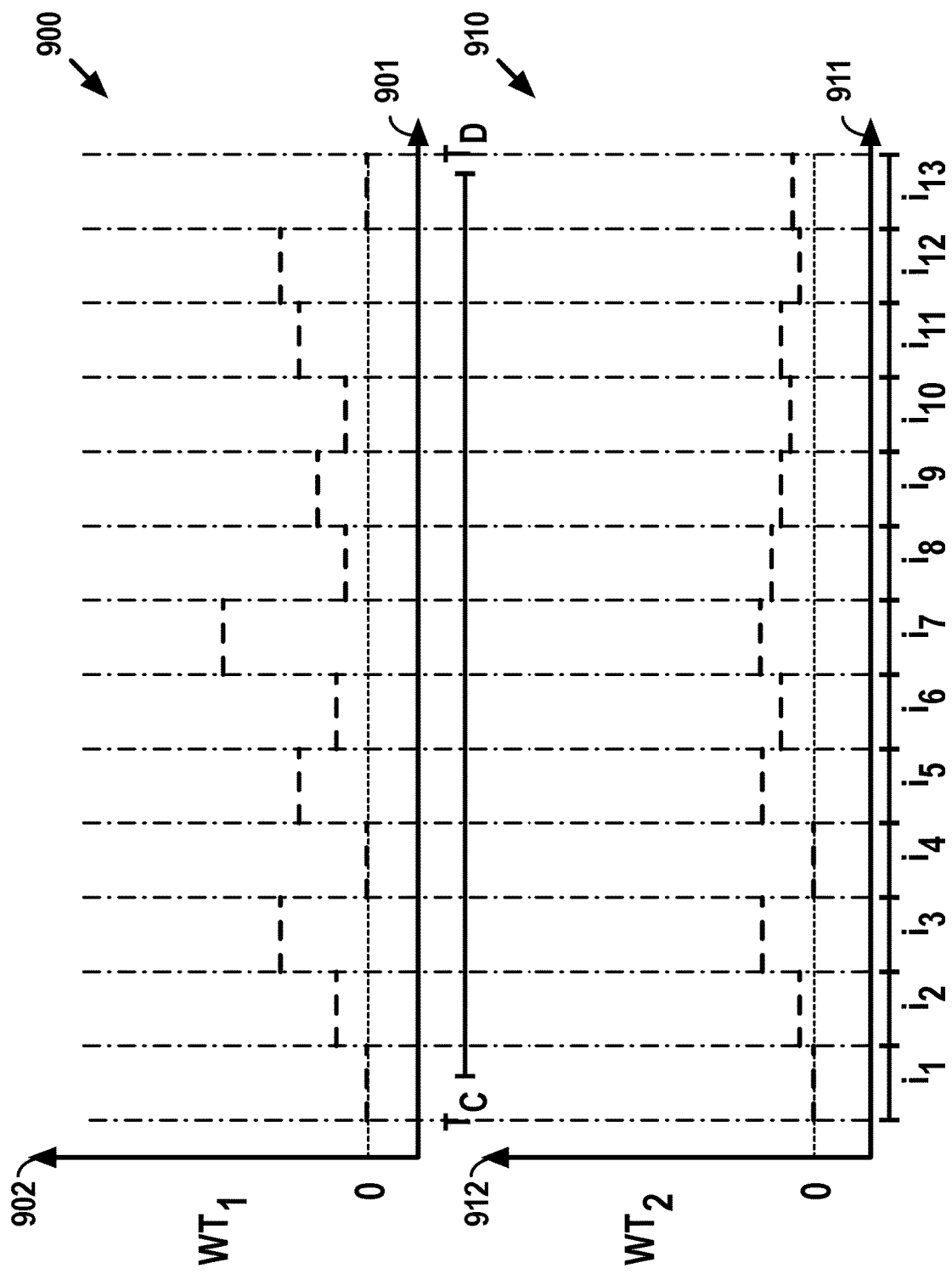
FIG. 9A provides a conceptual illustration of respective "yaw activity measure" datasets for two wind turbines that are part of a cluster.

To illustrate, FIG. 9A provides a conceptual illustration of respective "yaw activity measure" datasets for two wind turbines that are part of a cluster. In particular, data plot 900 illustrates a "yaw activity measure" dataset for a first wind turbine of the cluster (e.g., "$WT_1$") and data plot 910 illustrates a "yaw activity measure" dataset for a second wind turbine of the cluster (e.g., "$WT_2$"), where time is indicated by horizontal axes 901, 911 and "yaw activity measure" is indicated by vertical axes 902, 912. As shown, the lookback window is defined by a first point in time (e.g., "$T_C$") and a second point in time (e.g., "$T_D$").

Figure 9B:
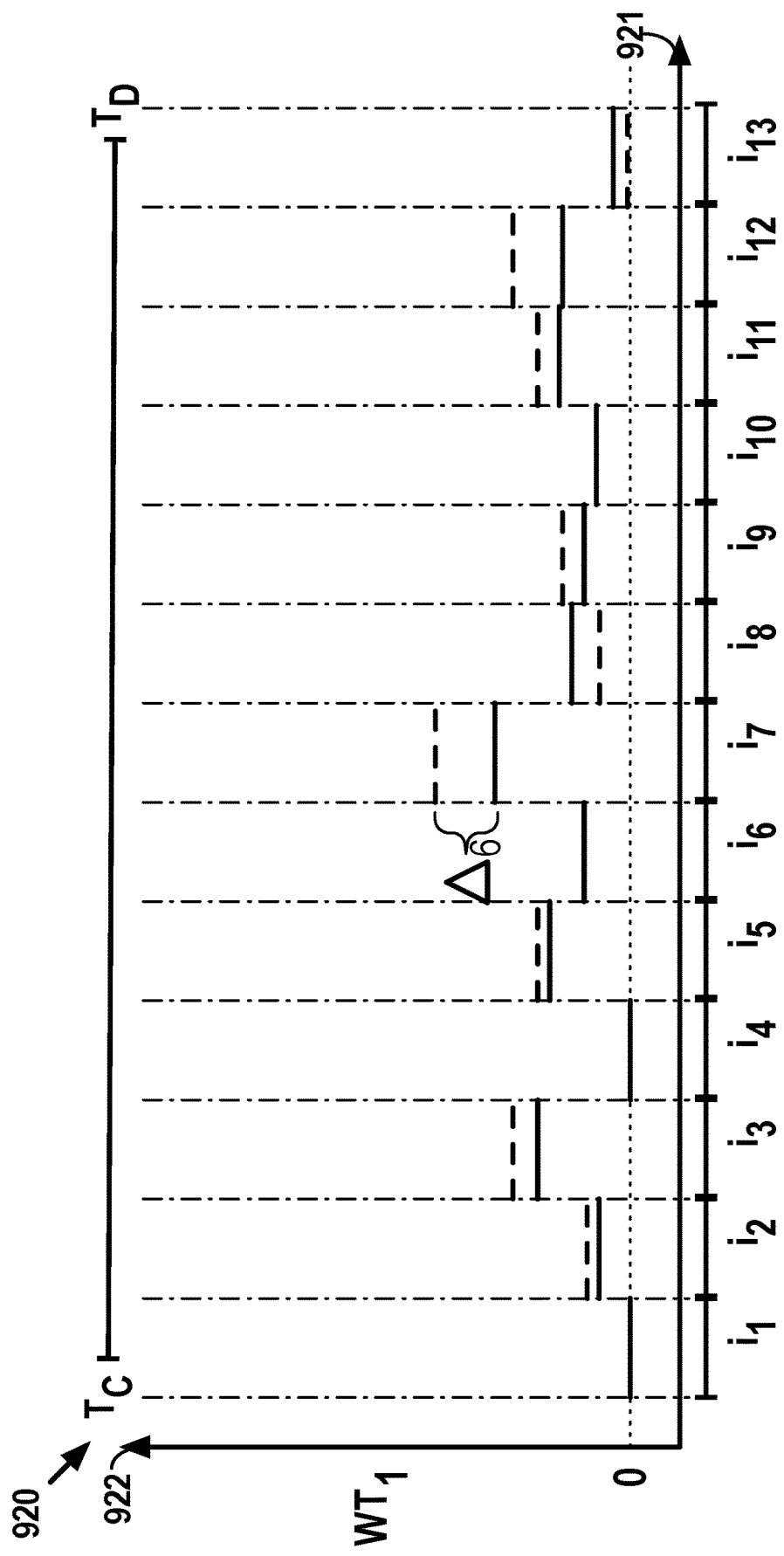
FIG. 9B provides a conceptual illustration of a cluster-level "yaw activity measure" dataset compared to a respective wind turbine's "yaw activity measure" dataset from which a respective "yaw activity differential" dataset is derived.

Moreover, each data plot 900 and 910 includes respective derived "yaw activity measures" (indicated by the dashed, horizontal lines) of the first and second wind turbine's yaw activity during discrete time intervals (e.g., "$i_1$"-"$i_{13}$") within the lookback window. Asset data platform 102 may derive a cluster-level "yaw activity measure" for each interval (e.g., $i_1$-$i_{13}$) by determining a respective average value of the respective derived "yaw activity measures" for each given interval from all of the wind turbines in the cluster (e.g., the two wind turbines, "$WT_1$" and "$WT_2$," and any other wind turbines in the cluster). FIG. 9B provides a conceptual illustration of a cluster-level "yaw activity measure" dataset (indicated by the solid, horizontal lines) that may be derived based at least on the "yaw activity measure" datasets illustrated in FIG. 9A.

At block 610, asset data platform 102 may determine, for each respective wind turbine in the cluster, a respective time-series "yaw activity differential" dataset based on the derived cluster-level time-series "yaw activity measure" dataset. In operation, asset data platform 102 may perform this function in a variety of manners.

As one possibility, asset data platform 102 may calculate, for each respective wind turbine in the cluster, a respective time-series "yaw activity differential" dataset that comprises a respective difference value between the respective wind turbine's "yaw activity measure" and the cluster-level "yaw activity measure" during each discrete time interval within the lookback window. Thus, by performing this operation for each discrete time interval within the lookback window, asset data platform 102 may produce a respective time-series "yaw activity differential" dataset for each wind turbine in the cluster. Other manners of deriving a "yaw activity differential" dataset are also possible.

To illustrate, FIG. 9B provides a conceptual illustration of a cluster-level "yaw activity measure" dataset compared to a respective wind turbine's "yaw activity measure" dataset from which a respective yaw activity differential" dataset is derived. In particular, data plot 920 builds from the data plots of FIG. 9A and illustrates a "yaw activity measure" dataset for the first wind turbine of the cluster (e.g., "$WT_1$") (indicated by the dashed, horizontal lines) along with a cluster-level "yaw activity measure" dataset (indicated by the solid, horizontal lines), where time is indicated by horizontal axis 921 and "yaw activity measure" is indicated by vertical axis 922. Asset data platform 102 calculates a time-series "yaw activity differential" dataset for the first wind turbine by determining a respective difference value between the cluster-level "yaw activity measure" and the first wind turbine's "yaw activity measure" for each discrete time interval (e.g., "$i_1$"-"$i_{13}$") within the lookback window. An example difference value is graphically depicted in data plot 920 for interval $i_6$. Notably, where the cluster-level "yaw activity measure" and the first wind turbine's "yaw activity measure" are equivalent (e.g., the difference value is zero), only the cluster-level "yaw activity measure" is shown via a solid, horizontal line.

Returning to FIG. 6, at block 612, asset data platform 102 may evaluate the respective "yaw activity differential" dataset for one or more respective wind turbine in the cluster to identify any "yaw activity differential" datasets that are indicative of irregular yaw activity. In other words, asset data platform 102 may evaluate a given wind turbine's "yaw activity differential" dataset to determine whether the given wind turbine is an "outlier" turbine having yaw activity that meaningfully diverges from the yaw activity of the other turbines in the cluster during the lookback window. In practice, asset data platform 102 may perform this evaluation in a variety of manners.

In one implementation, asset data platform 102 may evaluate one or more turbine's respective "yaw activity differential" dataset using a data science model that is configured to (i) receive a "yaw activity differential" dataset for a given wind turbine as its input and (ii) output an indication of whether that given wind turbine's "yaw activity differential" dataset is indicative of irregular yaw activity. Such a data science model may take various forms.

As one possibility, the data science model may comprise a predictive model that is derived by applying a machine-learning technique (e.g., a supervised or unsupervised machine-learning technique) to training data that includes historical "yaw activity differential" datasets for a plurality of wind turbines that have been derived in the manner described above, perhaps along with labels indicating times when the plurality of wind turbines were known to have a yawing issue. In example implementations, the machine-learning technique may involve utilizing one or more of logistic regression, support vector machine, random forest, and/or a neural network, among other possibilities.

As another possibility, the data science model may comprise a rules-based model that is derived by identifying values or ranges of values (and/or other features indicative of irregular yaw activity) corresponding to wind turbines exhibiting "regular" yaw activity and then in turn identifying one or more deviations from these values or ranges of values (and/or other features) that are associated with wind turbines exhibiting irregular yaw activity, which may then be embodied into a set of rules that comprises the rules-based model for detecting irregular yaw activity. For example, a rules-based model may be configured to detect irregular yaw activity at a given wind turbine if the turbine's "yaw activity differential" dataset exceeds a threshold differential value during a threshold number of time intervals within the lookback window. As another example, a rules-based model may be configured to detect irregular yaw activity at a given wind turbine when the turbine's "yaw activity differential" dataset exceeds a threshold differential value during a threshold number of consecutive time windows of a given length (e.g., at least one exceedance every few hours). As yet another example, a rules-based model may be configured to detect irregular yaw activity at a given wind turbine based on one or more historical responses to previous exceedances. For instance, a rule may dictate that, despite the turbine's "yaw activity differential" dataset being indicative of a triggering event (e.g., the turbine's "yaw activity differential" dataset exceeds a threshold differential value during a threshold number of time intervals within the lookback window), the present triggering event is ignored based on the same triggering event occurring for a threshold number of times over a given amount of time in the past (e.g., every month in the past 6 months), which may indicate that an individual responsible for overseeing the operation of the wind-turbine cluster is ignoring notifications of the particular triggering event. Other examples of rules for a rules-based model are also possible.

Asset data platform 102 may evaluate the respective "yaw activity differential" dataset for one or more respective wind turbines in the cluster to identify any "yaw activity differential" datasets that are indicative of irregular yaw activity using other types of data science models and/or other techniques as well.

At block 614, asset data platform 102 may generate an output indicating a wind turbine exhibiting irregular yaw activity based on the evaluation. For instance, if the evaluation of the "yaw activity differential" dataset for one or more turbines in the cluster leads to an identification of one or more "outlier" turbines, asset data platform 102 may generate a visual and/or audible alert (or other notification) and then provide the alert (or other notification) to an individual responsible for overseeing the operation of the wind-turbine cluster, such as by presenting a representation of an alert or notification at a work station, mobile device, or the like (e.g., by sending more or more signals to client station 106A and/or third-party platform 106B).

As one particular example, asset data platform 102 may cause a visual representation of a notification indicating irregular yaw activity at a given wind turbine to be presented at a display of client station 106A. As another particular example, asset data platform 102 may cause an audible notification indicating irregular yaw activity at a given wind turbine to be rendered at a speaker of client station 106A.

In some implementations, the output may generically identify the existence of irregular yaw activity at a given wind turbine. In other implementations, the output may more specifically identify a particular type of irregular yaw activity (e.g., an identification of over-yawing or under-yawing) at a given wind turbine. Other examples are also possible.

In some cases, asset data platform 102 may be configured to perform various other functions as a result of the evaluation at block 612. For example, asset data platform 102 may cause a work order or the like to be generated (e.g., by sending one or more instructions to work-order system 106D), such as a yaw-system-repair work order. As another example, asset data platform 102 may cause one or more yaw-system parts to be ordered (e.g., by sending one or more instructions to parts-ordering system 106E). Other examples are also possible.

VI. Conclusion

Example embodiments of the disclosed process have been described above. Those skilled in the art will understand, however, that changes and modifications may be made to the embodiments described without departing from the true scope and sprit of the present invention, which will be defined by the claims.

Further, to the extent that examples described herein involve operations performed or initiated by actors, such as "humans," "operators," "users" or other entities, this is for purposes of example and explanation only. The claims should not be construed as requiring action by such actors unless explicitly recited in the claim language.

The invention claimed is:

1. A computing system comprising:
   at least one processor;
   a non-transitory computer-readable medium; and
   program instructions stored on the non-transitory computer-readable medium that are executable by the at least one processor to cause the computing system to:
   at least one processor;
   a non-transitory computer-readable medium; and
   program instructions stored on the non-transitory computer-readable medium that are executable by the at least one processor to cause the computing system to:
   identify a cluster of two or more wind turbines;
   for each respective wind turbine of the cluster:
      obtain yaw-activity data that is indicative of the respective wind turbine's yaw activity during a particular window of time; and
      based on obtained yaw-activity data, derive a yaw-activity-measure dataset for the respective wind turbine that comprises, for each of a plurality of time intervals within the particular window of time, a respective measure of the respective wind turbine's amount of yaw activity during the time interval;
   based on the respective yaw-activity-measure datasets for the two or more wind turbines in the cluster, derive a cluster-level yaw-activity-measure dataset comprising a respective cluster-level yaw-activitymeasure for each of the plurality of time intervals within the particular window of time;

perform an evaluation of the respective yaw-activity-measure dataset for each of one or more wind turbines in the cluster as compared to the cluster-level yaw-activity-measure dataset, wherein the evaluation involves, for each respective wind turbine of the one or more wind turbines in the cluster:

determining a yaw-activity-differential dataset for the respective wind turbine comprising, for each of the plurality of time intervals within the particular window of time, a respective difference value between the respective wind turbine's yaw-activity-measure for the time interval and the cluster-level yaw-activity-measure for the time interval; and evaluating the yaw-activity-differential dataset that was determined for the respective wind turbine using a data science model that is configured to (i) receive a yaw-activity-differential dataset for a given wind turbine as input and (ii) based on an evaluation of the received yaw-activity-differential dataset, output a prediction whether the given wind turbine engaged in irregular yaw activity;

based on the evaluation, identify at least one wind turbine of the cluster that exhibited irregular yaw activity; and transmit, to an output device via a data network, a notification of the irregular yaw activity at the at least one wind turbine to notify one or more users.

2. The computing system of claim 1, wherein the program instructions that are executable by the at least one processor to cause the computing system to identify the cluster of two or more wind turbines comprise program instructions that are executable by the at least one processor to cause the computing system to:

identify a cluster of two or more wind turbines that experienced at least one common meteorological condition during a given period of time based on one or more of (i) data indicative of a respective geographical location of the two or more wind turbines, (ii) meteorological data captured by the two or more wind turbines during the given period of time, or (iii) weather data indicative of wind characteristics in proximity to the two or more wind turbines during the given period of time from a source other than the two or more wind turbines.

3. The computing system of claim 1, wherein the obtained yaw-activity data comprises one or more of (i) nacelle-position data indicating a position of a nacelle of the respective wind turbine at two or more points in time within the particular window of time, (ii) data indicating a number of times a gear of a yaw system of the respective wind turbine rotated by a gear tooth during the particular window of time, or (iii) data indicating an amount of time the respective wind turbine spent yawing during the particular window of time.

4. The computing system of claim 3, wherein the obtained yaw-activity data comprises nacelle-position data, and wherein the program instructions that are executable by the at least one processor to cause the computing system to derive the yaw-activity-measure dataset for the respective wind turbine comprise program instructions that are executable by the at least one processor to cause the computing system to:

for each of the plurality of time intervals within the particular window of time:

identify a number of nacelle-position datapoints comprised within the time interval;

if the number of nacelle-position datapoints does not exceed a threshold number, determine a difference between either (i) a maximum and minimum nacelle position within the time interval or (ii) a last and a first nacelle position within the time interval, and thereby derive a respective measure of the respective wind turbine's amount of yaw activity during the time interval; and otherwise, (i) split the time interval into a plurality of sub-intervals, (ii) determine, for each respective sub-interval of the plurality of sub-intervals, a difference between either (a) a maximum and minimum nacelle position within the respective sub-interval or (b) a last and a first nacelle position within the respective sub-interval, and (iii) aggregate the determined differences for the sub-intervals within the time interval, and thereby derive the respective measure of the respective wind turbine's amount of yaw activity during the time interval.

5. The computing system of claim 1, further comprising program instructions stored on the non-transitory computer-readable medium that are executable by the at least one processor to cause the computing system to:

for each of at least a subset of the respective wind turbines of the cluster:

before deriving the yaw-activity-measure dataset for the respective wind turbine, exclude, from the obtained yaw-activity data that is used to derive the yaw-activity-measure dataset for the respective wind turbine, yaw-activity data corresponding to one or more periods of time for which at least one of (i) a determination is made that the respective wind turbine was in a state of downtime or (ii) a determination is made that the cluster was in a state of downtime.

6. The computing system of claim 1, wherein the data science model comprises a predictive model that has been trained by applying a machine learning process to historical yaw-activity-differential datasets.

7. The computing system of claim 1, wherein the data science model comprises a rules-based model.

8. A method performed by a computing system, the method comprising:

identifying a cluster of two or more wind turbines;

for each respective wind turbine of the cluster:

obtaining yaw-activity data that is indicative of the respective wind turbine's yaw activity during a particular window of time; and based on obtained yaw-activity data, deriving a yaw-activity-measure dataset for the respective wind turbine that comprises, for each of a plurality of time intervals within the particular window of time, a respective measure of the respective wind turbine's amount of yaw activity during the time interval;

based on the respective yaw-activity-measure datasets for the two or more wind turbines in the cluster, deriving a cluster-level yaw-activity-measure dataset comprising a respective cluster-level yaw-activity-measure for each of the plurality of time intervals within the particular window of time;

performing an evaluation of the respective yaw-activity-measure dataset for each of one or more wind turbines in the cluster as compared to the cluster-level yaw-activity-measure dataset, wherein the evaluation involves, for each respective wind turbine of the one or more wind turbines in the cluster:
  determining a yaw-activity-differential dataset for the respective wind turbine comprising, for each of the plurality of time intervals within the particular window of time, a respective difference value between the respective wind turbine's yaw-activity-measure for the time interval and the cluster-level yaw-activity-measure for the time interval; and
  evaluating the yaw-activity-differential dataset that was determined for the respective wind turbine using a data science model that is configured to (i) receive a yaw-activity-differential dataset for a given wind turbine as input and (ii) based on an evaluation of the received yaw-activity-differential dataset, output a prediction whether the given wind turbine engaged in irregular yaw activity;
based on the evaluation, identifying at least one wind turbine of the cluster that exhibited irregular yaw activity; and
transmitting, to an output device via a data network, a notification of the irregular yaw activity at the at least one wind turbine to notify one or more users.

9. The method of claim 8, wherein identifying the cluster of two or more wind turbines comprises identifying a cluster of two or more wind turbines that experienced at least one common meteorological condition during a given period of time based on one or more of (i) data indicative of a respective geographical location of the two or more wind turbines, (ii) meteorological data captured by the two or more wind turbines during the given period of time, or (iii) weather data indicative of wind characteristics in proximity to the two or more wind turbines during the given period of time from a source other than the two or more wind turbines.

10. The method of claim 8, wherein the obtained yaw-activity data comprises one or more of (i) nacelle-position data indicating a position of a nacelle of the respective wind turbine at two or more points in time within the particular window of time, (ii) data indicating a number of times a gear of a yaw system of the respective wind turbine rotated by a gear tooth during the particular window of time, or (iii) data indicating an amount of time the respective wind turbine spent yawing during the particular window of time.

11. The method of claim 10, wherein the obtained yaw-activity data comprises nacelle-position data, and wherein deriving the yaw-activity-measure dataset for the respective wind turbine comprises:
  for each of the plurality of time intervals within the particular window of time:
    identifying a number of nacelle-position datapoints comprised within the time interval;
    if the number of nacelle-position datapoints does not exceed a threshold number, determining a difference between either (i) a maximum and minimum nacelle position within the time interval or (ii) a last and a first nacelle position within the time interval, and thereby deriving a respective measure of the respective wind turbine's amount of yaw activity during the time interval; and
    otherwise, (i) splitting the time interval into a plurality of sub-intervals, (ii) determining, for each respective sub-interval of the plurality of sub-intervals, a difference between either (a) a maximum and minimum nacelle position within the respective sub-interval or (b) a last and a first nacelle position within the respective sub-interval, and (iii) aggregating the determined differences for the sub-intervals within the time interval, and thereby deriving the respective measure of the respective wind turbine's amount of yaw activity during the time interval.

12. The method of claim 8, further comprising:
for each of at least a subset of the respective wind turbines of the cluster:
  before deriving the yaw-activity-measure dataset for the respective wind turbine, excluding, from the obtained yaw-activity data that is used to derive the yaw-activity-measure dataset for the respective wind turbine, yaw-activity data corresponding to one or more periods of time for which at least one of (i) a determination is made that the respective wind turbine was in a state of downtime or (ii) a determination is made that the cluster was in a state of downtime.

13. The method of claim 8, wherein the data science model comprises a predictive model that has been trained by applying a machine learning process to historical yaw-activity-differential datasets.

14. A non-transitory computer-readable storage medium having program instructions stored thereon that are executable to cause a computing system to:
identify a cluster of two or more wind turbines;
for each respective wind turbine of the cluster:
  obtain yaw-activity data that is indicative of the respective wind turbine's yaw activity during a particular window of time; and
  based on obtained yaw-activity data, derive a yaw-activity-measure dataset for the respective wind turbine that comprises, for each of a plurality of time intervals within the particular window of time, a respective measure of the respective wind turbine's amount of yaw activity during the time interval;
based on the respective yaw-activity-measure datasets for the two or more wind turbines in the cluster, derive a cluster-level yaw-activity-measure dataset comprising a respective cluster-level yaw-activity-measure for each of the plurality of time intervals within the particular window of time;
perform an evaluation of the respective yaw-activity-measure dataset for each of one or more wind turbines in the cluster as compared to the cluster-level yaw-activity-measure dataset, wherein the evaluation involves, for each respective wind turbine of the one or more wind turbines in the cluster:
  determining a yaw-activity-differential dataset for the respective wind turbine comprising, for each of the plurality of time intervals within the particular window of time, a respective difference value between the respective wind turbine's yaw-activity-measure for the time interval and the cluster-level yaw-activity-measure for the time interval; and
  evaluating the yaw-activity-differential dataset that was determined for the respective wind turbine using a data science model that is configured to (i) receive a yaw-activity-differential dataset for a given wind turbine as input and (ii) based on an evaluation of the received yaw-activity-differential dataset, output a prediction whether the given wind turbine engaged in irregular yaw activity;
based on the evaluation, identify at least one wind turbine of the cluster that exhibited irregular yaw activity; and
transmit, to an output device via a data network, a notification of the irregular yaw activity at the at least one wind turbine to notify one or more users.

15. The computer-readable storage medium of claim 14, wherein the program instructions that are executable to cause the computing system to identify the cluster of two or more wind turbines comprise program instructions that are executable to cause the computing system to:
- identify a cluster of two or more wind turbines that experienced at least one common meteorological condition during a given period of time based on one or more of (i) data indicative of a respective geographical location of the two or more wind turbines, (ii) meteorological data captured by the two or more wind turbines during the given period of time, or (iii) weather data indicative of wind characteristics in proximity to the two or more wind turbines during the given period of time from a source other than the two or more wind turbines.

16. The computer-readable storage medium of claim 14, wherein the obtained yaw-activity data comprises one or more of (i) nacelle-position data indicating a position of a nacelle of the respective wind turbine at two or more points in time within the particular window of time, (ii) data indicating a number of times a gear of a yaw system of the respective wind turbine rotated by a gear tooth during the particular window of time, or (iii) data indicating an amount of time the respective wind turbine spent yawing during the particular window of time.

17. The computer-readable storage medium of claim 16, wherein the obtained yaw-activity data comprises nacelle-position data, and wherein the program instructions that are executable to cause the computing system to derive the yaw-activity-measure dataset for the respective wind turbine comprise program instructions that are executable to cause the computing system to:
- for each of the plurality of time intervals within the particular window of time:
  - identify a number of nacelle-position datapoints comprised within the time interval;
  - if the number of nacelle-position datapoints does not exceed a threshold number, determine a difference between either (i) a maximum and minimum nacelle position within the time interval or (ii) a last and a first nacelle position within the time interval, and thereby derive a respective measure of the respective wind turbine's amount of yaw activity during the time interval; and
  - otherwise, (i) split the time interval into a plurality of sub-intervals, (ii) determine, for each respective sub-interval of the plurality of sub-intervals, a difference between either (a) a maximum and minimum nacelle position within the respective sub-interval or (b) a last and a first nacelle position within the respective sub-interval, and (iii) aggregate the determined differences for the sub-intervals within the time interval, and thereby derive the respective measure of the respective wind turbine's amount of yaw activity during the time interval.

18. The computer-readable storage medium of claim 14, further comprising program instructions stored thereon that are executable to cause the computing system to:
- for each of at least a subset of the respective wind turbines of the cluster:
  - before deriving the yaw-activity-measure dataset for the respective wind turbine, exclude, from the obtained yaw-activity data that is used to derive the yaw-activity-measure dataset for the respective wind turbine, yaw-activity data corresponding to one or more periods of time for which at least one of (i) a determination is made that the respective wind turbine was in a state of downtime or (ii) a determination is made that the cluster was in a state of downtime.

19. The computer-readable storage medium of claim 14, wherein the data science model comprises a predictive model that has been trained by applying a machine learning process to historical yaw-activity-differential datasets.

20. The computer-readable storage medium of claim 19, wherein the data science model comprises a rules-based model.

* * * * *